US012646259B2

(12) United States Patent
Takama

(10) Patent No.: US 12,646,259 B2
(45) Date of Patent: Jun. 2, 2026

(54) INFORMATION PROCESSING APPARATUS

(71) Applicant: CANON KABUSHIKI KAISHA,
Tokyo (JP)

(72) Inventor: Yasufumi Takama, Kanagawa (JP)

(73) Assignee: Canon Kabushiki Kaisha, Tokyo (JP)

( * ) Notice: Subject to any disclaimer, the term of this
patent is extended or adjusted under 35
U.S.C. 154(b) by 199 days.

(21) Appl. No.: 18/470,613

(22) Filed: Sep. 20, 2023

(65) Prior Publication Data

US 2024/0096024 A1    Mar. 21, 2024

(30) Foreign Application Priority Data

Sep. 20, 2022    (JP) ................................. 2022-149598

(51) Int. Cl.
G06T 19/00        (2011.01)
G06F 3/04817      (2022.01)
G06F 21/10        (2013.01)
(52) U.S. Cl.
CPC .......... G06T 19/00 (2013.01); G06F 3/04817
(2013.01); G06F 21/101 (2023.08)
(58) Field of Classification Search
CPC .. H04N 13/239; H04N 13/117; H04N 13/282;
H04N 13/243; H04N 13/279; H04N
5/2224; H04N 23/90; H04N 13/293;
H04N 13/271; G06T 15/205; G06T
7/194; G06T 19/00; G06F 21/101; G06F
3/04817
See application file for complete search history.

(56) References Cited

U.S. PATENT DOCUMENTS

| | | | |
|---|---|---|---|
| 9,294,757 B1 | 3/2016 | Lewis | |
| 10,783,597 B1 * | 9/2020 | Li ............................. G06F 9/54 |
| 11,348,152 B1 | 5/2022 | Davis | |
| 2017/0316608 A1 | 11/2017 | Khalid | |
| 2018/0204381 A1 * | 7/2018 | Kanatsu .................. G06T 7/248 |
| 2018/0330163 A1 * | 11/2018 | Matsuzaki ........... G06V 10/993 |
| 2018/0333019 A1 * | 11/2018 | Wang ......................... A47L 9/32 |
| 2018/0362118 A1 * | 12/2018 | Barthlott .................. B63B 1/38 |
| 2020/0294293 A1 | 9/2020 | Boenig, II | |
| 2020/0322591 A1 * | 10/2020 | Yano .................... H04N 13/239 |

(Continued)

FOREIGN PATENT DOCUMENTS

| | | |
|---|---|---|
| CN | 114978596 A | 8/2022 |
| JP | 2015045920 A | 3/2015 |
| JP | 2019102940 A | 6/2019 |

*Primary Examiner* — Abderrahim Merouan
(74) *Attorney, Agent, or Firm* — Canon U.S.A., Inc. IP
Division

(57)        ABSTRACT

An image processing apparatus includes a first output unit
configured to output, regarding multiple material data
recorded on a blockchain and generated based on images
captured by multiple image capturing apparatuses, the mul-
tiple material data including one or more material data
owned by a first user who is a current owner and one or more
material data owned by a second user who is a current
owner, information indicating the material data owned by
the first user who is the current owner, a second acquisition
unit configured to acquire information indicating the mate-
rial data selected by the first user, and a second output unit
configured to output a virtual viewpoint image that is formed
based on the material data corresponding to the information
acquired by the second acquisition unit and indicating the
material data.

10 Claims, 19 Drawing Sheets

| CONTENT NAME | REGISTRATION DATE | GAME DATE | DATA TYPE | NUMBER OF REMAINING CONTENT ITEMS |
|---|---|---|---|---|
| Content name1 | 2022/m/d | 2022/m/d | 700  710 | 40/100 |
| Content name2 | 2022/m/d | 2022/m/d | 720  730 | 40/100 |
| Content name3 | 2022/m/d | 2022/m/d | 700  710  720  730 | 0/100 |

(56) References Cited

U.S. PATENT DOCUMENTS

| | | | |
|---|---|---|---|
| 2020/0397472 A1* | 12/2020 | MacDonald | A61M 60/109 |
| 2020/0411965 A1* | 12/2020 | Chu | H01Q 1/2291 |
| 2022/0030215 A1* | 1/2022 | Yano | G06T 15/205 |
| 2022/0137705 A1* | 5/2022 | Hashimoto | G06F 1/1694 |
| | | | 345/156 |
| 2022/0165012 A1* | 5/2022 | Andrew | G06V 40/10 |
| 2023/0181144 A1* | 6/2023 | Sun | A61B 6/0487 |
| | | | 378/205 |
| 2024/0096024 A1* | 3/2024 | Takama | G06F 21/604 |

* cited by examiner

FIG. 15

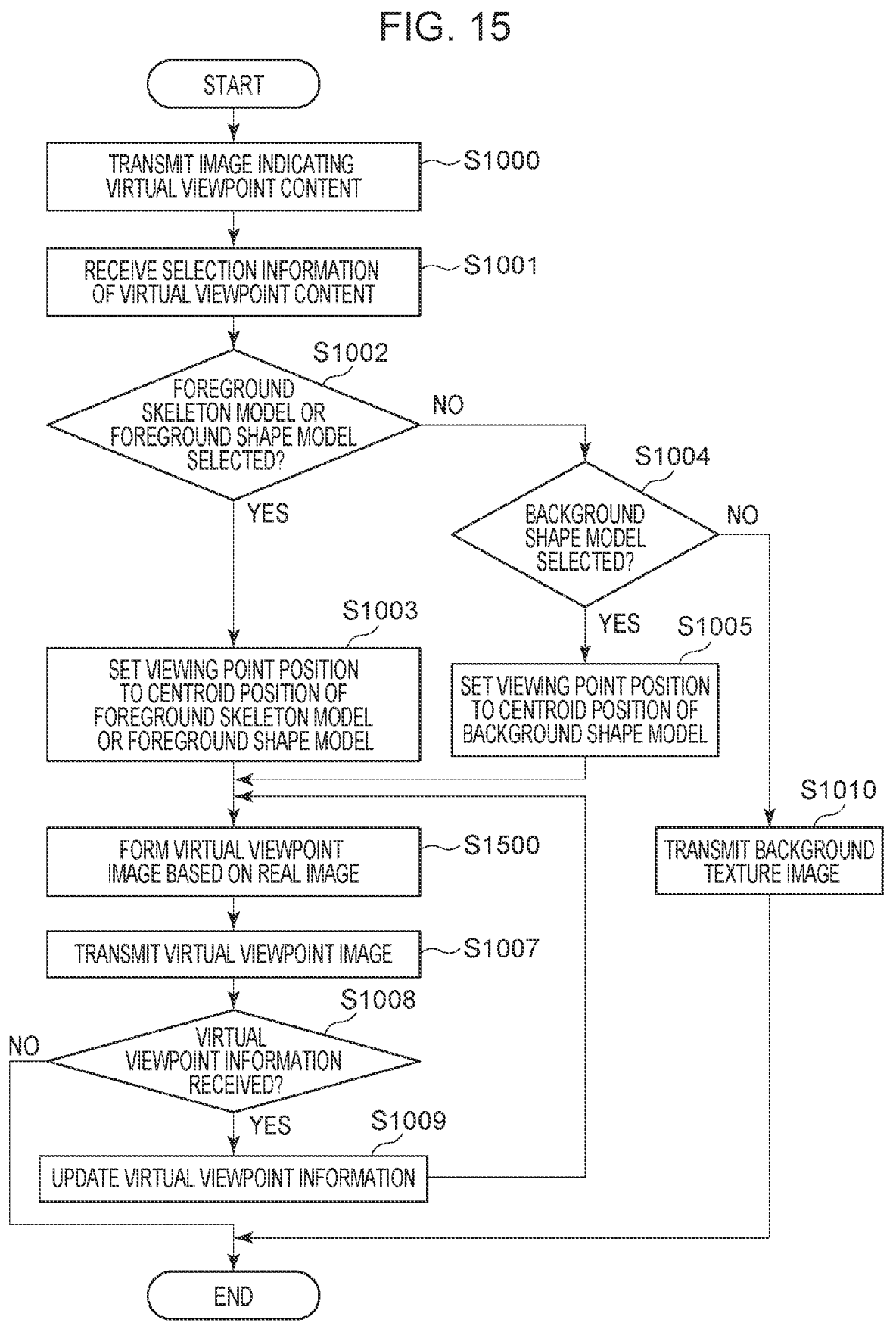

```
                    ( START )
                        │
                        ▼
          ┌──────────────────────────┐
          │  TRANSMIT IMAGE INDICATING │─── S1000
          │  VIRTUAL VIEWPOINT CONTENT │
          └──────────────────────────┘
                        │
                        ▼
          ┌──────────────────────────┐
          │  RECEIVE SELECTION INFORMATION │─── S1001
          │  OF VIRTUAL VIEWPOINT CONTENT  │
          └──────────────────────────┘
                        │        S1002
                        ▼
                 ╱───────────────╲
                ╱   FOREGROUND     ╲       NO
               ╱  SKELETON MODEL OR  ╲──────────────┐
               ╲  FOREGROUND SHAPE   ╱              │
                ╲  MODEL SELECTED?  ╱               │
                 ╲───────────────╱                 ▼      S1004
                        │                     ╱───────────╲       NO
                       YES                   ╱  BACKGROUND  ╲──────────┐
                        │                    ╲  SHAPE MODEL  ╱         │
                        │                     ╲  SELECTED?  ╱          │
             S1003      │                      ╲─────────╱             │
                        ▼                          │                   │
          ┌──────────────────────────┐           YES    S1005         │
          │  SET VIEWING POINT POSITION │          │                   │
          │  TO CENTROID POSITION OF    │          ▼                   │
          │  FOREGROUND SKELETON MODEL  │   ┌──────────────────────┐   │
          │  OR FOREGROUND SHAPE MODEL  │   │ SET VIEWING POINT     │   │
          └──────────────────────────┘   │ POSITION TO CENTROID  │   │
                        │                 │ POSITION OF BACKGROUND│   │
                        │◄────────────────│ SHAPE MODEL           │   │
                        │◄────────────────┴──────────────────────┘   │
                        │                                             │
                        ▼                                   S1010     │
          ┌──────────────────────────┐              ┌──────────────┐ │
          │  FORM VIRTUAL VIEWPOINT    │─── S1500    │  TRANSMIT     │◄┘
          │  IMAGE BASED ON REAL IMAGE │              │  BACKGROUND   │
          └──────────────────────────┘              │  TEXTURE IMAGE│
                        │                            └──────────────┘
                        ▼                                     │
          ┌──────────────────────────┐                       │
          │  TRANSMIT VIRTUAL VIEWPOINT IMAGE │─── S1007      │
          └──────────────────────────┘                       │
                        │        S1008                        │
                        ▼                                      │
                 ╱───────────────╲                            │
        NO      ╱     VIRTUAL      ╲                           │
      ┌────────╱  VIEWPOINT INFORMATION╲                       │
      │        ╲     RECEIVED?     ╱                           │
      │         ╲───────────────╱                             │
      │                │   YES      S1009                      │
      │                ▼                                       │
      │   ┌──────────────────────────────┐                    │
      │   │ UPDATE VIRTUAL VIEWPOINT INFORMATION │────────────┐│
      │   └──────────────────────────────┘                   ││
      │                │                                       ││
      └────────────────┤◄──────────────────────────────────────┘
                       ▼
                   ( END )
```

INFORMATION PROCESSING APPARATUS

BACKGROUND OF THE DISCLOSURE

Field of the Disclosure

The present disclosure relates to an information processing apparatus, an information processing method, a computer-readable storage medium storing a program, and so on.

Description of the Related Art

Attention is focused on a technique of forming a virtual viewpoint image looking from a designated virtual viewpoint based on multiple images that are obtained by capturing images from different directions with multiple cameras. Japanese Patent Laid-Open No. 2015-045920 discloses a method of capturing images of a subject with multiple cameras installed at different positions and forming a virtual viewpoint image by utilizing a three-dimensional shape model of the subject, the model being estimated from the captured images.

On the other hand, attention is also focused on a blockchain technique of assigning a Non-Fungible-Token (NFT) to digital content, such as a virtual space, a digital item in a computer game, or a digital artwork, and verifying the ownership. Specification of U.S. Patent Application Publication No. 2017/316608 discloses a method of assigning the ownership to a digital item.

However, any method of, corresponding to the ownership of one or more digital content items used to form the virtual viewpoint image, controlling a method of forming the virtual viewpoint image or a process of displaying the digital content items is not disclosed so far.

The present disclosure enables a content display process to be controlled based on both the ownership assigned to digital content used in forming a virtual viewpoint image and information of a system user.

SUMMARY OF THE DISCLOSURE

According to an aspect, the present disclosure provides an information processing apparatus including a first acquisition unit configured to acquire user information of a first user, a first output unit configured to output, regarding multiple material data recorded on a blockchain and generated based on multiple images captured by multiple image capturing apparatuses, the multiple material data including one or more material data owned by the first user who is a current owner and one or more material data owned by a second user who is a current owner, information indicating the material data owned by the first user who is the current owner, a second acquisition unit configured to acquire, from the information indicating the material data output by the first output unit, part of the information indicating the material data selected by the first user, and a second output unit configured to output a virtual viewpoint image that is formed based on the material data corresponding to the information acquired by the second acquisition unit and indicating the material data.

Further features of the present disclosure will become apparent from the following description of exemplary embodiments with reference to the attached drawings.

BRIEF DESCRIPTION OF THE DRAWINGS

FIG. 15 is a chart representing a process of forming the virtual viewpoint image based on the virtual viewpoint content owned by the user in the second embodiment.

DESCRIPTION OF THE EMBODIMENTS

Figure 1:
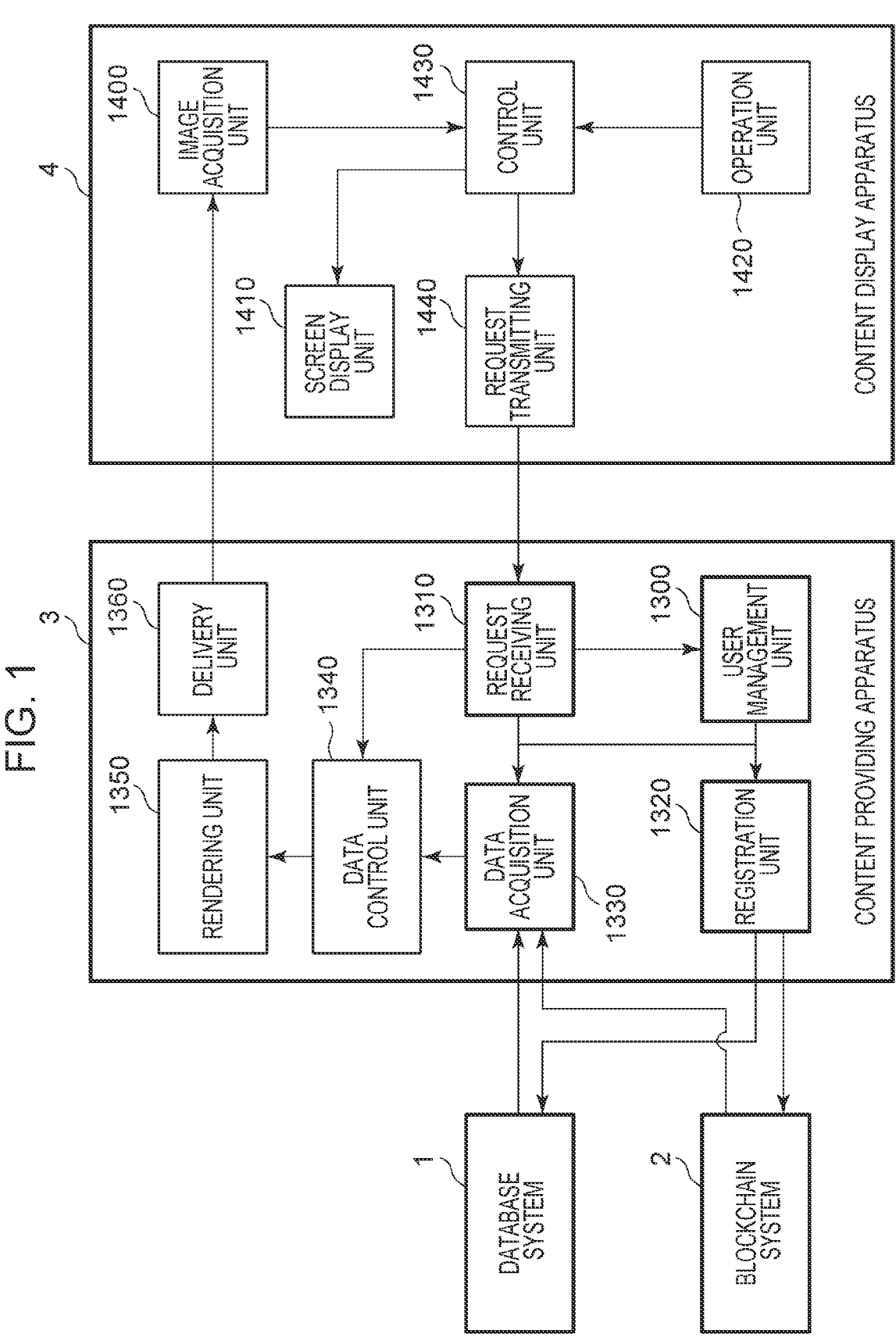
FIG. 1 is a block diagram of an image processing system according to a first embodiment.

Embodiments will be described in detail below with reference to the drawings. It is to be noted that the present disclosure is not limited to the following embodiments. In the drawings, the same or similar components are denoted by the same reference numerals, and duplicate description of those components is omitted.

First Embodiment

A first embodiment is described in connection with a method of assigning a Non-Fungible Token (hereinafter abbreviated to "NFT") to digital content used to form a virtual viewpoint image and controlling a digital content display process based on both owner information of the digital content and user information. The NFT is one kind of token issued to circulate on a blockchain. By utilizing the NFT, a one and only value can be given to the digital content. A token standard, called ERC-721 or ERC-1155, is known as an example of NFT standards.

Although the virtual viewpoint image in this embodiment is also called a free viewpoint video, the virtual viewpoint image is not limited to an image corresponding to a viewpoint that is freely (optionally) designated by a user and, for example, an image such as corresponding to a viewpoint selected from multiple candidates by a user is also included in the virtual viewpoint image. Although this embodiment is described mainly in connection with the case in which a virtual viewpoint is designated by a user operation, the virtual viewpoint may be automatically designated based on a result of image analysis, and so on. Although this embodiment is described mainly in connection with the case in which the virtual viewpoint image is a moving image, the virtual viewpoint image may be a still image.

The virtual viewpoint information used in forming the virtual viewpoint image is information indicating a position and a direction (visual line direction) of the virtual viewpoint. In more detail, the virtual viewpoint information is a parameter set including parameters representing a three-dimensional position of the virtual viewpoint and parameters representing orientations in pan, tilt, and roll direction. Details of the virtual viewpoint information are not limited to the above-mentioned ones. In an example, the parameter set serving as the virtual viewpoint information may include parameters representing a size (viewing angle) of a view field of the virtual viewpoint. The virtual viewpoint information may include multiple parameter sets. In an example, the virtual viewpoint information may include multiple parameter sets corresponding respectively to multiple frames forming a moving image of the virtual viewpoint image and may indicate a position and a direction of the virtual viewpoint at each of multiple continuous time points.

The virtual viewpoint image is formed, by way of example, as follows. First, multiple images (multiple viewpoint images) are acquired by capturing images from different directions with multiple image capturing apparatuses. Then, a foreground image resulting from extracting a foreground region corresponding to a predetermined object, such as a human figure or a ball, and a background image resulting from extracting a background region except for the foreground region are acquired from each of the multiple viewpoint images. Furthermore, a foreground model representing a three-dimensional shape of the predetermined object and texture data for coloring the foreground model are generated based on the foreground image, and texture data for coloring a background model representing a three-dimensional shape of a background, such as a stadium, is generated based on the background image. Then, the virtual viewpoint image is formed by mapping the respective texture data onto the foreground model and the background model and by executing rendering in accordance with the virtual viewpoint indicated by the virtual viewpoint information. However, a method of forming the virtual viewpoint image is not limited to the above-described example, and various methods, such as a method of forming the virtual viewpoint image by projective transform of the captured image without using the three-dimensional model, can be used.

A virtual camera is a camera virtually set different from the image capturing apparatuses actually installed around an image capturing region and represents the concept that is used to explain the virtual viewpoint in forming the virtual viewpoint image for convenience. In other words, the virtual viewpoint image can be regarded as an image captured from the virtual viewpoint that is set in a virtual space associated with the image capturing region. A position and an orientation of the viewpoint in the virtual image capturing can be expressed as a position and an orientation of the virtual camera. Stated another way, supposing that a camera is present at the position of the virtual viewpoint set in a space, the virtual viewpoint image can be said as an image simulating a captured image that is obtained by the above-mentioned camera. In this embodiment, change in the virtual viewpoint over time is denoted by a virtual camera path. However, using the concept of the virtual camera is not essential to implement the features of the embodiment. Thus, it is just required that at least information indicating a particular position in the space and information indicating an orientation are set and that the virtual viewpoint image is formed based on the set information.

The digital content used to form the virtual viewpoint image in this embodiment targets a shape model and a skeleton model of a character and a background shape model and a background texture image both representing information of a space where the character is present in a virtual world. In this embodiment, the shape model and the skeleton model of the character are called respectively a foreground shape model and a foreground skeleton model. The character is a predetermined object, such a human figure or a ball. The character is created by using an existing CG tool. The digital content is expressed in a file format represented by FBX, for example. The foreground shape model is a general mesh model of a three-dimensional shape using a triangle or a rectangle as an element, and a vortex of each element has coordinates. The foreground skeleton model is a bone model in which joints of parts, such as an arm and a leg of the character, and a relationship of connection between the joints are set in advance, and a three-dimensional posture of the character is expressed by positions and angles of the joints. In other words, the foreground skeleton model expresses motion information of the character. Furthermore, the mesh model can be deformed corresponding to a motion of the foreground skeleton model if information indicating to which part each vortex of the mesh belongs is further generated in advance by using the CG tool, for example. Thus, the mesh model making a motion over time can be generated by combining the foreground shape model and the foreground skeleton model of the same subject. Note that, in this embodiment, mesh of the foreground shape model does not include color information and the mesh of the foreground shape model is displayed in color set by a content display apparatus.

For example, if the set color is gray, the vortexes of the meshes of all the foreground shape models are each displayed in gray. However, the present disclosure is not limited to that example, and a creator of the digital content may set the color information in advance, or the color information may be changed according to metadata of the foreground shape model. For example, if the foreground shape model is a model for a character representing a basketball player, the color information is set according to a team color. A method of expressing the background shape model is similar to that in the case of expressing the foreground shape model. The background texture image is an image pasted to the mesh model based on a corresponding relationship between the vortex of each element of the background shape model and the coordinates on the image and is expressed in a general image format, such as BMP or PNG. The background shape model and the background texture image correspond to the same background model (object of the three-dimensional shape). In other words, the digital content is material data to form the virtual viewpoint image. Hereinafter the digital content used to form the virtual viewpoint image is called virtual viewpoint content.

System Configuration

An image processing system according to the first embodiment will be described below with reference to the drawings.

FIG. 1 is a block diagram of the image processing system according to the first embodiment. The image processing system is constituted by a database system 1, a blockchain system 2, a content providing apparatus 3, and a content display apparatus 4.

The database system 1 stores and manages the foreground shape model, the foreground skeleton model, the background shape model, and the background texture image. In this embodiment, the database system 1 stores and manages content data and metadata of each virtual viewpoint content. The content data of each virtual viewpoint content indicates the foreground shape model, the foreground skeleton model, the background shape model, and the background texture image themselves. The metadata of each virtual viewpoint content is data accompanying the content data. For example, in the case of storing and managing the foreground shape model of the basketball player, the metadata includes the date when the foreground shape model was registered on the blockchain, the date when the foreground shape model was created, the name of a creator of the foreground shape model, the name of the player, audio data, and so on. The metadata further includes a sale status (whether the content is vendable and a selling price when vendable) of the virtual viewpoint content. The sale status of the virtual viewpoint content is set to "unvendable" as an initial value, and the current owner can change the sale status. Unintentional dealing of the virtual viewpoint content can be prevented with such setting that the sale status is changed to the initial value "unvendable" after transaction between users.

The blockchain system 2 records the virtual viewpoint content and the owner information on the blockchain in response to a request from the content providing apparatus 3. More specifically, the blockchain system 2 records the content ID of the virtual viewpoint content, the user ID of the owner, and the NFT assigned to the virtual viewpoint content.

Details of the above-described process will be described with reference to FIG. 5. On that occasion, a certain number of NFTs predetermined by the creator of the virtual viewpoint content are issued for the content of interest. For example, when 500 NFTs are issued, 500 persons at maximum can own the content of interest. In other words, aiming to increase a property value of the content, scarcity can be given to the content by, for example, limiting the number of content items to be distributed and managing the content items with the aid of serial numbers.

The content providing apparatus 3 is an information processing apparatus constituted by a user management unit 1300, a request receiving unit 1310, a registration unit 1320, a data acquisition unit 1330, a data control unit 1340, a rendering unit 1350, and a delivery unit 1360. The content providing apparatus 3 registers the virtual viewpoint content created by a user in the database system 1 and delivers the virtual viewpoint image created based on the virtual viewpoint content, acquired from the database system 1, to a user. The user management unit 1300 executes new registration, editing, deletion, and management of an account of each user utilizing the system. Information to be managed includes the user ID and name, the role of the user, account information for dealing of the virtual viewpoint content, and so on. The role of the user is, for example, a seller who creates and sells the virtual viewpoint content, a viewer who views the virtual viewpoint image formed based on the virtual viewpoint content, or a distributor who distributes the virtual viewpoint image. The request receiving unit 1310 allocates processing to the registration unit 1320, the data acquisition unit 1330, and the data control unit 1340 in accordance with request information received from the content display apparatus 4. For example, when the user registers the created virtual viewpoint content in the database system 1, a content registration request is sent to the registration unit 1320. Upon the content registration request being received by the registration unit 1320, the registration unit 1320 sends the content data and the metadata of the virtual viewpoint content to the database system 1. When the user purchases the virtual viewpoint content, the request receiving unit 1310 receives a purchase request. Then, the request receiving unit 1310 sends an acquisition request for the virtual viewpoint content to the data acquisition unit 1330. The data acquisition unit 1330 acquires the content data and the metadata of the virtual viewpoint content from the database system 1 and sends them to the data control unit 1340. The data control unit 1340 extracts, from the content data of the virtual viewpoint content, part of the content data of the virtual viewpoint content, the part being used to form a simplified virtual viewpoint image to be displayed on a purchase screen, and transmits the extracted content data to the rendering unit 1350. The rendering unit 1350 forms an image indicating the virtual viewpoint content and the virtual viewpoint image that is formed from both the virtual viewpoint content and the virtual viewpoint information, and then transmits the formed images to the delivery unit 1360. In an example of a method of forming the virtual viewpoint image by the rendering unit 1350, the rendering unit 1350 forms a foreground image (image of a subject region) and a background image (image not including the subject) when the virtual viewpoint content arranged in the virtual space based on the content data is viewed from virtual camera. Furthermore, the rendering unit 1350 forms the virtual viewpoint image by superimposing the formed foreground image on the formed background image. The delivery unit 1360 delivers the image acquired from the rendering unit 1350 to an image acquisition unit of the content display apparatus 4. When the user forms the virtual viewpoint image by selecting the virtual viewpoint content owned by the user, the request receiving unit 1310 receives selection information of the virtual viewpoint content from the content display apparatus 4. Then, the request receiving unit 1310 transmits the selection information to the data control unit 1340 and controls the virtual viewpoint content to be displayed as the virtual viewpoint image. The content data of the selected virtual viewpoint content is transmitted to the rendering unit 1350, and the virtual viewpoint image is formed. The formed virtual viewpoint image is transmitted from the rendering unit 1350 to the delivery unit 1360. After that, the delivery unit 1360 transmits the virtual viewpoint image to the content display apparatus 4.

The content display apparatus 4 is constituted by an image acquisition unit 1400, a screen display unit 1410, an operation unit 1420, a control unit 1430, and a request transmitting unit 1440. The content display apparatus 4 provides a viewing environment for the virtual viewpoint image to the user while controlling a content display process. The image acquisition unit 1400 acquires the image transmitted from the delivery unit 1360 of the content providing apparatus 3. The acquired image is transmitted to the control unit 1430. The screen display unit 1410 displays the image received from the control unit 1430. In more detail, the screen display unit 1410 displays, for example, a viewing screen for the virtual viewpoint content, a content list display screen, a content registration screen, on a display. The viewing screen includes a region where an image of a rendering result of the virtual viewpoint content is displayed and a GUI (Graphical User Interface) for use in selecting a display method. The content list display screen displays a list for selection of the content to be purchased. The content registration screen includes a GUI for use in entering information such as a place of data to be registered and a purchase price. The operation unit 1420 receives information input by the user and transmits the input information to the control unit 1430. The operation unit 1420 is, for example, a keyboard, a mouse, or a touch panel. The control unit 1430 transmits the image received from the image acquisition unit 1400 to the screen display unit 1410. On that occasion, an image obtained after editing the acquired image as appropriate may be transmitted to the screen display unit 1410. Moreover, the input information received from the operation unit 1420 is transmitted to the request transmitting unit 1440. The request transmitting unit 1440 transmits the request received from the control unit 1430 to the content providing apparatus 3. The request includes, for example, new registration and management of the user account, new registration, acquisition, and purchase of the content, and manipulation of the virtual viewpoint. In the following description of this embodiment, the content display apparatus 4 is explained as a tablet terminal with a touch panel. The content display apparatus 4 is not limited to the tablet terminal and may be a laptop or the like.

Figure 2:
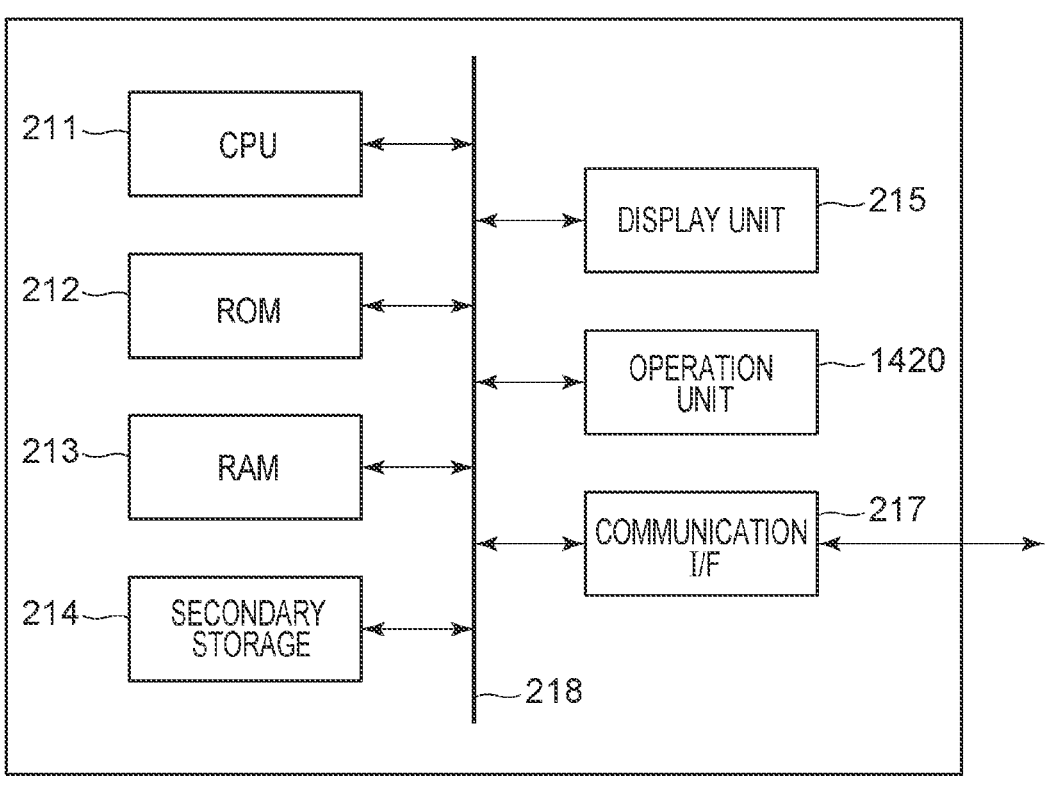
FIG. 2 is a hardware block diagram of a content display apparatus in the first embodiment.

FIG. 2 is a hardware block diagram of the content display apparatus 4. The content providing apparatus 3 also has the same hardware configuration. The content display apparatus 4 includes a CPU 211, a ROM 212, a RAM 213, a secondary storage 214, a display unit 215, an operation unit 1420, a communication OF 217, and a bus 218. The CPU 211 implements various functions of the content display apparatus 4 illustrated in FIG. 1 by controlling the entirety of the system in accordance with computer programs and data that are stored in the ROM 212 and the RAM 213. Each system may include one or more units of dedicated hardware different from the CPU 211, and at least part of processing to be executed by the CPU 211 may be executed by the dedicated hardware. The dedicated hardware may be, for example, an ASIC (Application Specific Integrated Circuit). The ROM 212 stores programs that do not need to be changed. The RAM 213 temporarily stores programs and data supplied from the secondary storage 214, data supplied from the outside via the communication I/F 217, and so on. The secondary storage 214 is constituted by a hard disk drive, for example, and stores various data such as image data and audio data.

The display unit 215 is constituted by a liquid crystal display or LEDs, for example, and displays a GUI used by the user to operate the system. The operation unit 1420 is constituted by a keyboard, a mouse, a joystick, a touch panel, for example, and enters various instructions to the CPU 211 in response to operations by the user. The CPU 211 operates as a display control unit for controlling the display unit 215 and as an operation control unit for controlling the operation unit 1420.

The communication OF 217 is used for communication with an apparatus outside the system. For example, when the system is connected to the external apparatus by wire, a communication cable is connected to the communication I/F 217. When the system has the function of wireless communication with the external apparatus, the communication I/F

217 includes an antenna. The bus 218 connects the individual components for transfer of information.

While, in this embodiment, the display unit 215 and the operation unit 1420 are present inside the system, at least one of the display unit 215 and the operation unit 1420 may be present as a separate apparatus outside the system.

Operation Flow

Figure 3:
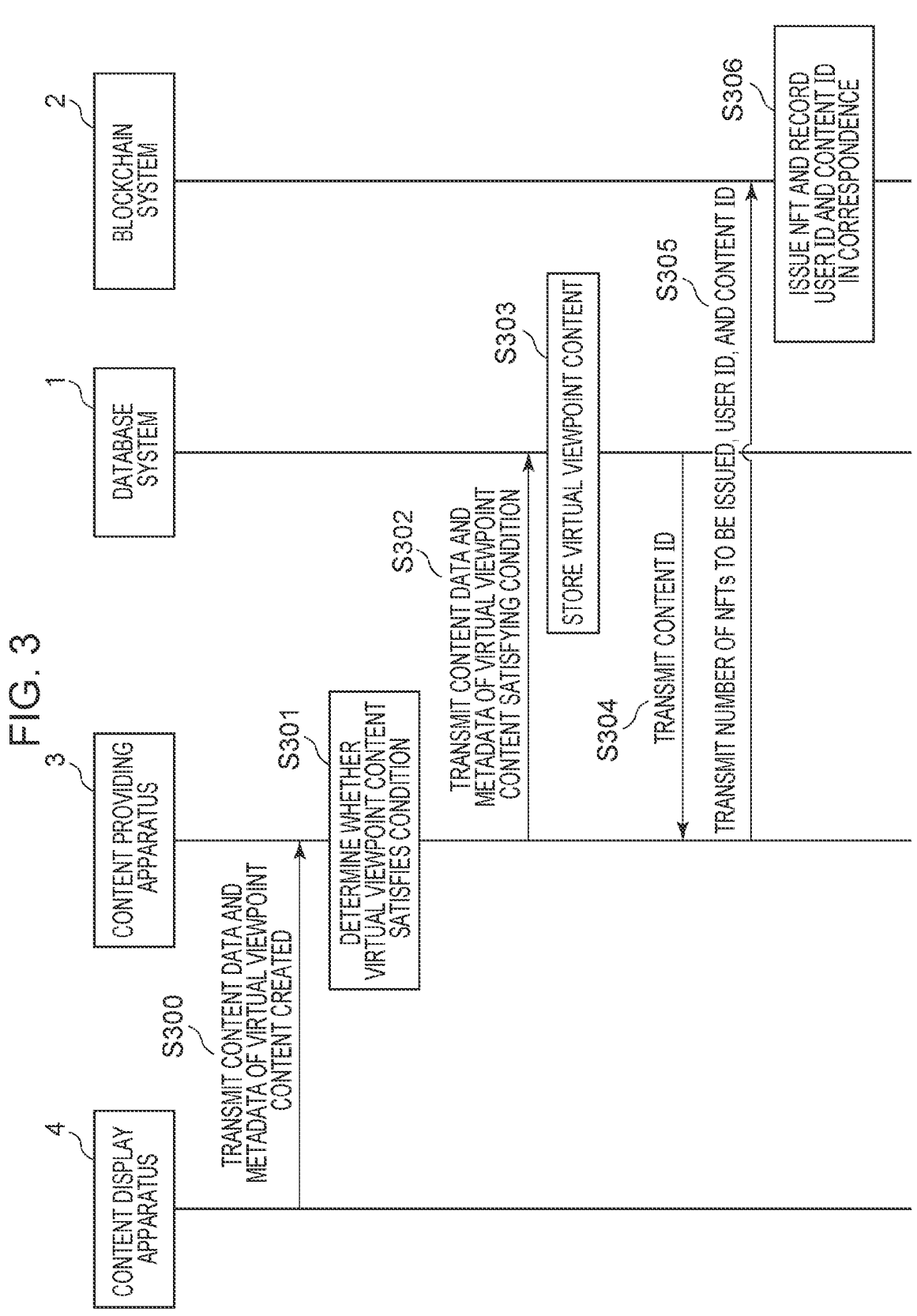
FIG. 3 is a chart representing a flow of a process of registering virtual viewpoint content in the first embodiment.

FIG. 3 is a chart representing a flow of a process of registering the virtual viewpoint content in the database system 1. This embodiment is premised on that the user account for registration of the virtual viewpoint content is generated in advance, and is described about the flow after the user has performed a login process by inputting the user ID and the password. On that occasion, it is supposed that the user ID is recorded in the user management unit 1300 of the content providing apparatus 3. It is also supposed that the virtual viewpoint content is created in advance and is stored in the content display apparatus 4. Similar conditions are further applied to the cases of FIGS. 5, 6, and 7, and duplicate description is omitted.

Step S300

In S300, the content display apparatus 4 transmits, to the content providing apparatus 3, the content data and the metadata of the virtual viewpoint content to be registered. The metadata includes the number of NFTs issued for the virtual viewpoint content.

Step S301

In S301, the content providing apparatus 3 determines whether the content data and the metadata of the received virtual viewpoint content satisfy a specified condition. In more detail, the content providing apparatus 3 determines whether the metadata includes information regarding the data type and the number of NFTs to be issued. Alternatively, the content providing apparatus 3 may determine whether the received virtual viewpoint content is the same as that registered in the database system 1. In that case, a hash value of the content data of the received virtual viewpoint content and a hash value of the content data of the virtual viewpoint content registered in the database system 1 are compared. If both the hash values are the same, it is determined that the condition is not satisfied because of the same virtual viewpoint content. If both the hash values are different, it is determined that the condition is satisfied because of different virtual viewpoint content items. The determination may be made by preparing a learning model to determine a similar product. In this embodiment, subsequent processing is described on an assumption that the condition is satisfied.

Step S302

In S302, the content providing apparatus 3 transmits, to the database system 1, the content data and the metadata of the virtual viewpoint content for which it has been determined in S301 that the condition is satisfied.

Step S303

In S303, the database system 1 registers the content data and the metadata of the virtual viewpoint content, received in S302, in correspondence with each other. At the time of the registration, a content ID is issued for the virtual viewpoint content. The content ID is a serial number allocated to the virtual viewpoint content and is used when the virtual viewpoint content is searched for in the database system 1. Furthermore, the sale status of the virtual viewpoint content is set to the initial value. With this step, the virtual viewpoint content can be registered in the database system 1.

Step S304

In S304, the database system 1 transmits the content ID to the content providing apparatus 3.

Step S305

In S305, the content providing apparatus 3 transmits the number of NFTs issued for the virtual viewpoint content received in S300, the user ID, and the content ID to the blockchain system 2.

Step S306

In S306, the blockchain system 2 issues NFT for the virtual viewpoint content in accordance with the number of NFTs to be issued, that number being received in S305, and records a transaction. The transaction includes at least the NFT, the user ID as the owner information, and the content ID corresponding to the virtual viewpoint content. In this embodiment, the user ID of the user who has performed the process of registering the virtual viewpoint content is recorded as the first owner. With this step, the owner information of the virtual viewpoint content can be recorded on the blockchain.

Figure 4:
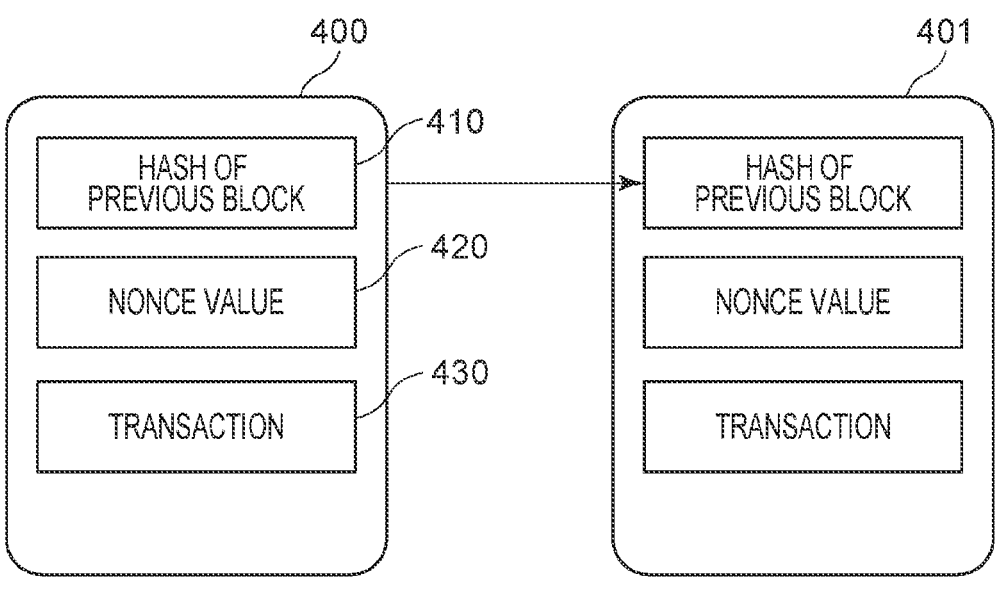
FIG. 4 illustrates a data structure of a blockchain.

FIG. 4 illustrates a data structure of the blockchain. Reference numeral 401 denotes a latest block, and 400 denotes a previous block. Those blocks are each made up of a hash value 410, a nonce value 420, and a transaction 430. The nonce value is used to generate a block. One or more transactions are recorded in the transaction 430. The transaction records, as information indicating trading of the virtual viewpoint content, the NFT corresponding to the virtual viewpoint content, the content ID corresponding to the virtual viewpoint content, the owner information of the virtual viewpoint content, for example, the user ID (not illustrated). Furthermore, by recording the user ID of the creator of the virtual viewpoint content in the transaction, the creator of the virtual viewpoint content can be identified even when the owner is changed by the trading. In addition, description regarding smart contract (automatic contract execution for an NFT purchaser) may be stored and registered on the blockchain. In an example, when the smart contract includes the user ID of the creator and description regarding whether the right of pursuit is enforceable, a profit can be returned to the creator each time the content is traded.

Figure 5:
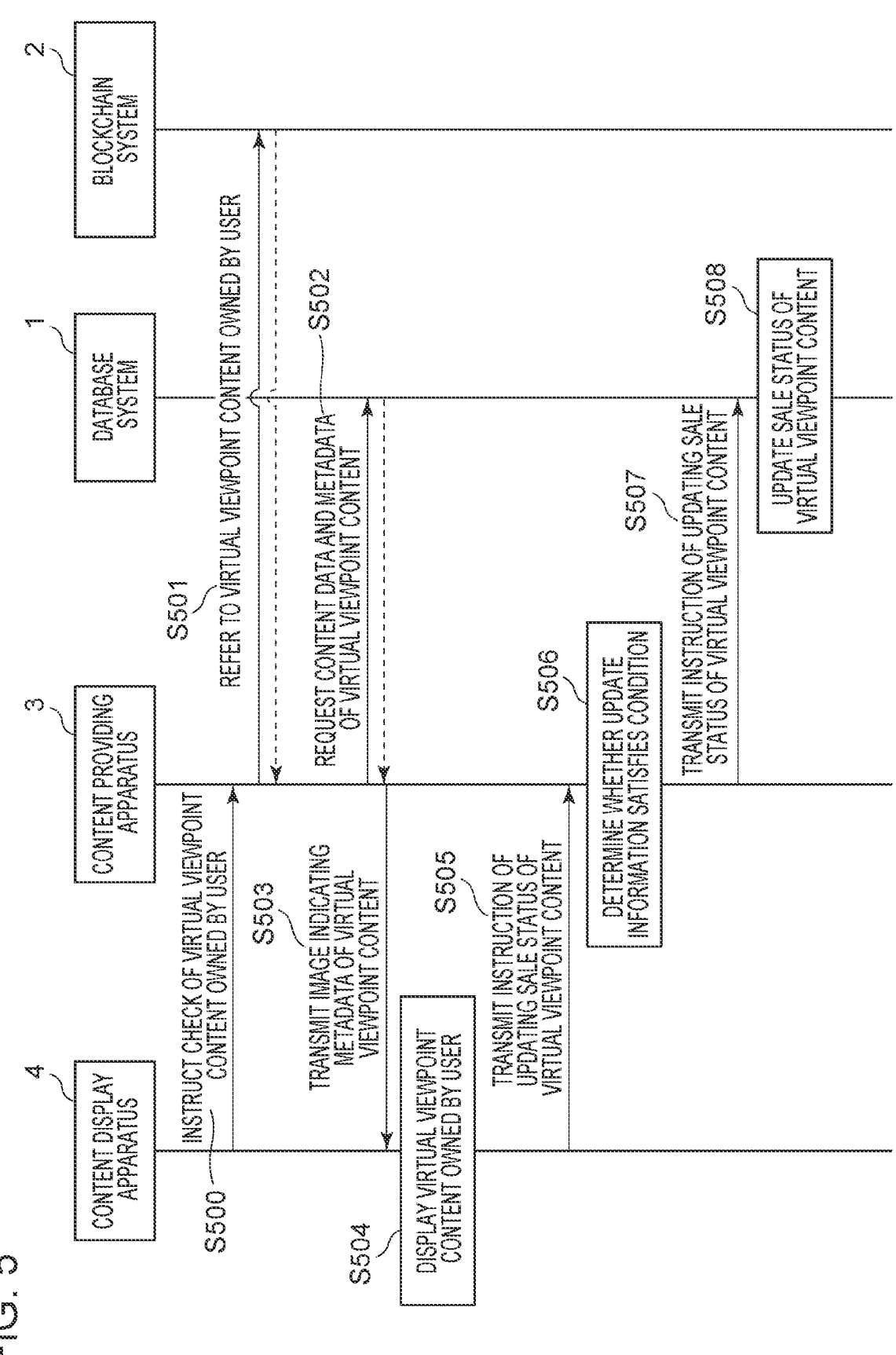
FIG. 5 is a chart representing a flow of a process of updating a sale status of the virtual viewpoint content in the first embodiment.

FIG. 5 is a chart representing a flow of a process of setting the sale status of the virtual viewpoint content owned by the user.

Step S500

In S500, the content display apparatus 4 requests, to the content providing apparatus 3, information of the virtual viewpoint content owned by the user. There is no need of requesting information of all items of the virtual viewpoint content owned by the user. In an example, the content display apparatus 4 may request information of the foreground shape model owned by the user. Alternatively, the content display apparatus 4 may request information of the foreground shape model of some athlete, that model being owned by the user.

Step S501

In S501, the content providing apparatus 3 transmits the user ID to the blockchain system 2 and identifies the virtual viewpoint content owned by the user by referring to the transactions recorded in the blockchain system 2. At that time, the content providing apparatus 3 acquires the content ID of the identified virtual viewpoint content.

Step S502

In S502, the content providing apparatus 3 transmits the content ID, acquired in S501, to the database system 1. The database system 1 having received the content ID transmits, to the content providing apparatus 3, the content data and the metadata of the virtual viewpoint content corresponding to the content ID.

Step S503

In S503, the content providing apparatus 3 transmits an image indicating the metadata of the virtual viewpoint content to the content display apparatus 4. While, in this embodiment, the image indicating the metadata is transmitted to the content display apparatus 4, the present disclosure is not limited to that case. The metadata itself may be transmitted, or the content data may be transmitted.

Step S504

In S504, the content display apparatus 4 displays the image indicating the metadata of the virtual viewpoint content received in S503. The user sets the sale status of the virtual viewpoint content by referring to the displayed image.

Step S505

In S505, the content display apparatus 4 transmits, in accordance with s user operation, an instruction of updating the sale status of the virtual viewpoint content to the content providing apparatus 3.

Step S506

In S506, the content providing apparatus 3 determines whether the instruction of updating the sale status received in S505 satisfies a condition. For example, when the content providing apparatus 3 sets a condition on a minimum selling price or a maximum selling price of the virtual viewpoint content, it is determined whether the sale status instructed by the user satisfies the condition. In this embodiment, subsequent processing is described on an assumption that the condition is satisfied.

Step S507

In S507, the content providing apparatus 3 transmits, to the database system 1, the update instruction for which it has been determined in S506 that the condition is satisfied.

Step S508

In S508, the database system 1 updates the sale status of the virtual viewpoint content in accordance with the instruction of updating the sale status received in S507.

With the above-described process, the user can set the sale status of the virtual viewpoint content owned by the user.

Figure 6:
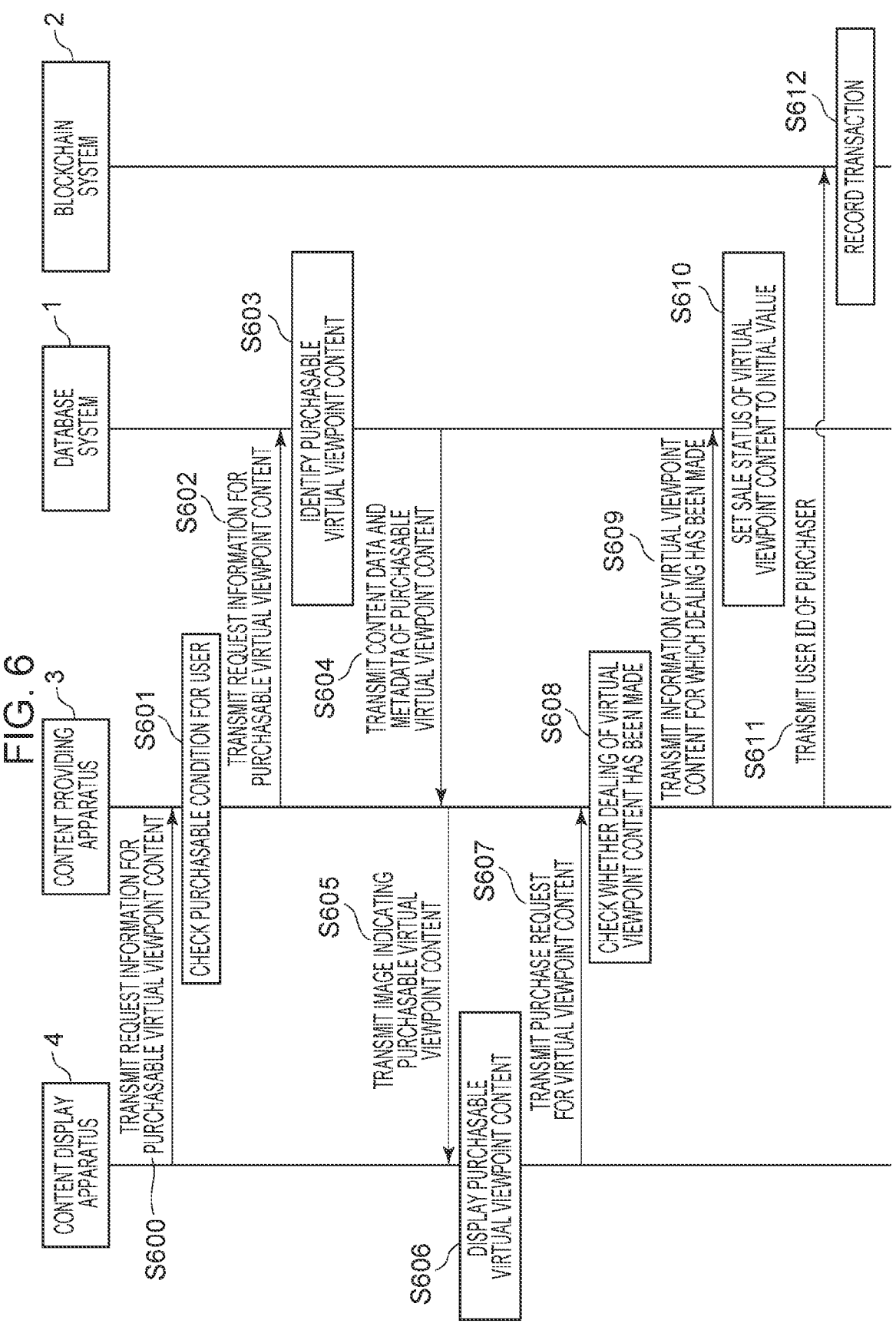
FIG. 6 is a chart representing a flow of a process in which a user purchases the virtual viewpoint content in the first embodiment.

FIG. 6 is a chart representing a flow of a process when a user purchases the virtual viewpoint content.

Step S600

In S600, the content display apparatus 4 transmits, to the content providing apparatus 3, request information for the virtual viewpoint content that is purchasable. A request condition, such as the data type or the content name, may be specified in the request information.

Step S601

In S601, the content providing apparatus 3 checks the user account information and confirms a purchasable condition for the user. In this embodiment, for example, purchasable virtual viewpoint content may be partially limited if checking a purchase history of the user indicates that the number of purchases of the virtual viewpoint content by the user is two or less. However, the present disclosure is not limited to that example. The purchasable condition may be omitted, or purchasable virtual viewpoint content may be determined depending on user activity by utilizing a fan token, for example. The purchasable condition is supposed to be managed by the user management unit 1300 per user.

Step S602

In S602, the content providing apparatus 3 transmits, to the database system 1, the request information for the purchasable virtual viewpoint content, including the pur-chasable condition checked in S601.

Step S603

In S603, the database system 1 identifies the virtual viewpoint content for which the sale status is set to be purchasable. When the request condition is received in S600, the database system 1 identifies the virtual viewpoint content in consideration of the request condition. In an example, when a foreground shape model of a dunk scene of a player A and a foreground skeleton model of the dunk scene of the player A are designated, the virtual viewpoint content corresponding or related to those models are iden-tified. When the purchasable condition for the user is received, the database system 1 identifies the virtual view-point content corresponding to the condition. Thus, the virtual viewpoint content for which the sale status is set to be purchasable, including the above-described conditions as well, is identified.

Step S604

In S604, the database system 1 transmits, to the content providing apparatus 3, the content data and the metadata of the identified virtual viewpoint content for which the sale status is set to be purchasable.

Step S605

In S605, the content providing apparatus 3 forms an image indicating the virtual viewpoint content from the content data and the metadata of the virtual viewpoint content received in S604 and transmits the formed image to the content display apparatus 4. The image indicating the virtual viewpoint content may be formed using both or either one of the content data and the metadata. In an example, when the content data is the foreground shape model and the metadata includes the date of creation and the selling price of the foreground shape model, an icon denoting the fore-ground shape model and an image indicating the date of creation and the selling price may be formed. While, in this embodiment, the image indicating the virtual viewpoint content is transmitted to the content display apparatus, the present disclosure is not limited to that case. Audio data and/or numerical data of the selling price themselves, included in the metadata, may be transmitted together with the image.

Step S606

In S606, the content display apparatus 4 displays the image indicating the purchasable virtual viewpoint content received in S605. When multiple items of the virtual view-point content are purchasable, a list of those items of the virtual viewpoint content may be displayed. Details of the purchase screen for the virtual viewpoint content, displayed on the content display apparatus 4, will be described with reference to FIG. 7.

Step S607

In S607, the content display apparatus 4 transmits a purchase request for the virtual viewpoint content to the content providing apparatus 3 in accordance with a user operation.

Step S608

In S608, the content providing apparatus 3 checks whether dealing of the virtual viewpoint content has been made. In an example, if the purchase process performed by the user has been completed, the dealing is regarded as having been made. Description of the purchase process is omitted here. The following steps are described on an assumption that the dealing has been made.

Step S609

In S609, the content providing apparatus 3 transmits, to the database system 1, information of the virtual viewpoint content for which the dealing has been made.

Step S610

In S610, the database system 1 sets, to the initial value, the sale status of the virtual viewpoint content for which the dealing has been made.

Step S611

In S611, the content providing apparatus 3 transmits the user ID of the purchaser to the blockchain system 2.

Step S612

In S612, the blockchain system 2 records the transaction while the user ID received in S609 is set as the current owner.

With the above-described process, when the user has purchased the virtual viewpoint content, the sale status in the database system 1 can be updated, and a new transaction can be recorded on the blockchain system 2.

Figure 7:
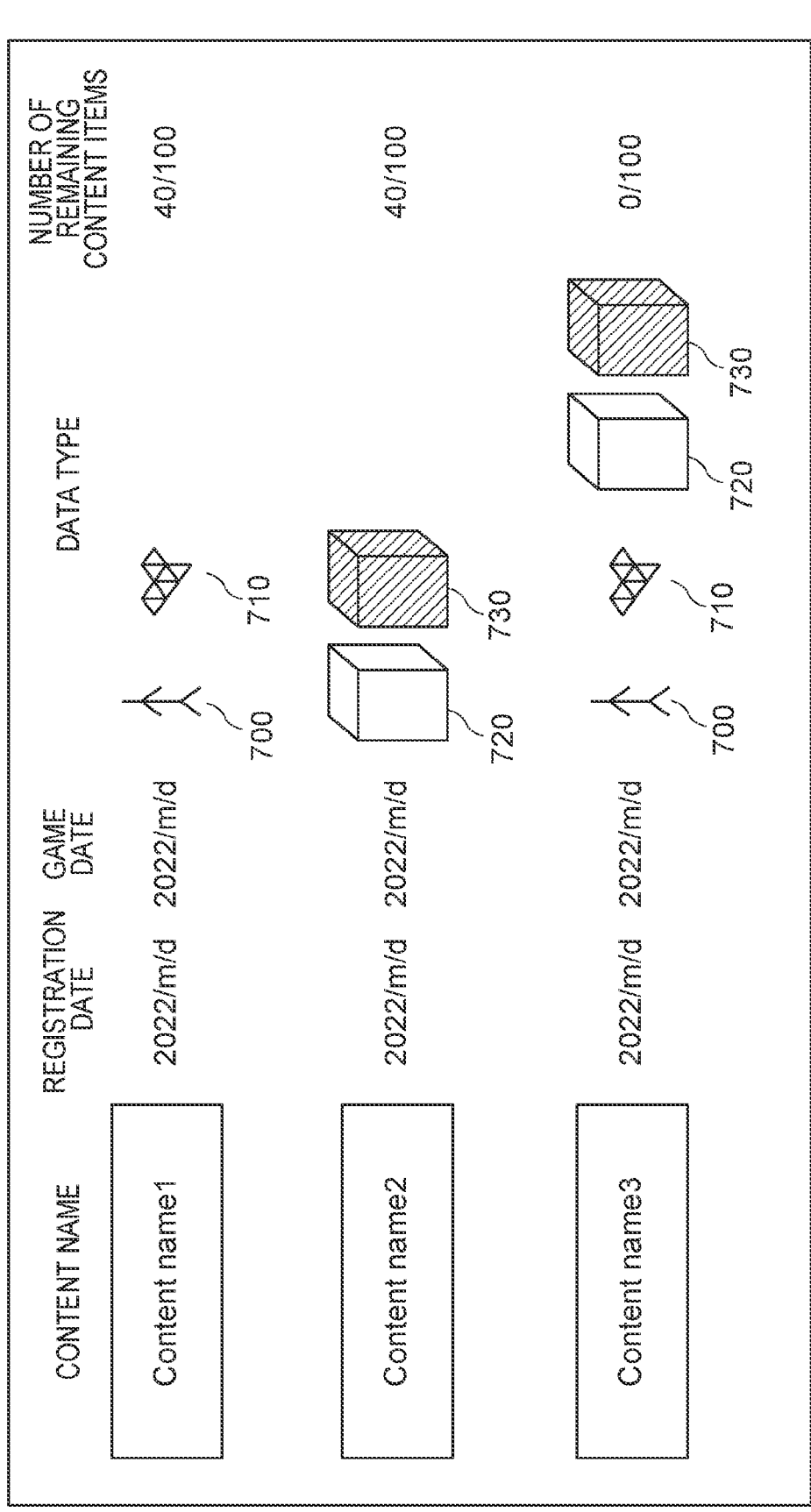
FIG. 7 illustrates a purchase screen for the virtual viewpoint content in the first embodiment.

FIG. 7 illustrates the purchase screen for the virtual viewpoint content, that purchase screen being displayed on the content display apparatus 4 in S606. While, in this embodiment, multiple items of the virtual viewpoint content are combined and sold as one content, the present disclosure is not limited to that case, and one virtual viewpoint content may be sold. For example, information indicating the name of the registered content, the registration date when the virtual viewpoint content was registered, and the type of the data included in the content are displayed on the purchase screen. Furthermore, when the virtual viewpoint content is virtual viewpoint content regarding a particular game of a particular sport, the game data is also displayed. In an example, the virtual viewpoint content includes the fore-ground shape model and the foreground skeleton model created based on an image captured in the basket league opener, the date of the league opener is displayed as the game date. An icon 700 denoting the data type indicates that the foreground skeleton model is included in the content. Similarly, an icon 710 indicates that the foreground shape model is included in the content. Moreover, an icon 720 indicates that the background shape model is included in the content, and an icon 730 indicates that the background texture image is included in the content. Thus, FIG. 7 indicates that content denoted as "Content name1" includes the foreground skeleton model and the foreground shape model of a character, and that content denoted as "Content name2" includes the background shape model and the background texture image. FIG. 7 further indicates that content denoted as "Content name3" includes not only the foreground skeleton model and the foreground shape model of the character, but also the background shape model and the background texture image. While the multiple items of the virtual viewpoint content are sold as a set, respective characters represented by the foreground shape model and the foreground skeleton model are the same character, and respective background models represented by the back-ground shape model and the background texture image are the same object of the three-dimensional shape. When the virtual viewpoint content is assigned with NFT, the number of remaining content items and the total number of content items are also displayed. The total number of content items in each content is set based on the number of NFTs issued for virtual viewpoint content items included in each content. If the user determines the purchase by selecting the content and the data type to be purchased with the GUI, the purchase request and purchase information are transmitted from the control unit 1430 to the request transmitting unit 1440. The purchase information is supposed to be the content ID of the virtual viewpoint content included in the selected content.

With the user selecting each icon, detailed information of the virtual viewpoint content corresponding to that icon may be displayed separately. For example, when the icon 700 is selected, the name of the character of the foreground skeleton model corresponding to the icon 700, the name of the creator of the foreground skeleton model, and so on may be displayed. As an alternative, simplified information generated from the content data of the virtual viewpoint content may be displayed. In more detail, when the foreground skeleton model is information indicating a motion for 20 seconds, a video of the bone model representing a motion for 5 seconds may be created and displayed. This enables the user to easily recognize the details of the virtual viewpoint content included in the purchasable content.

Figure 8:
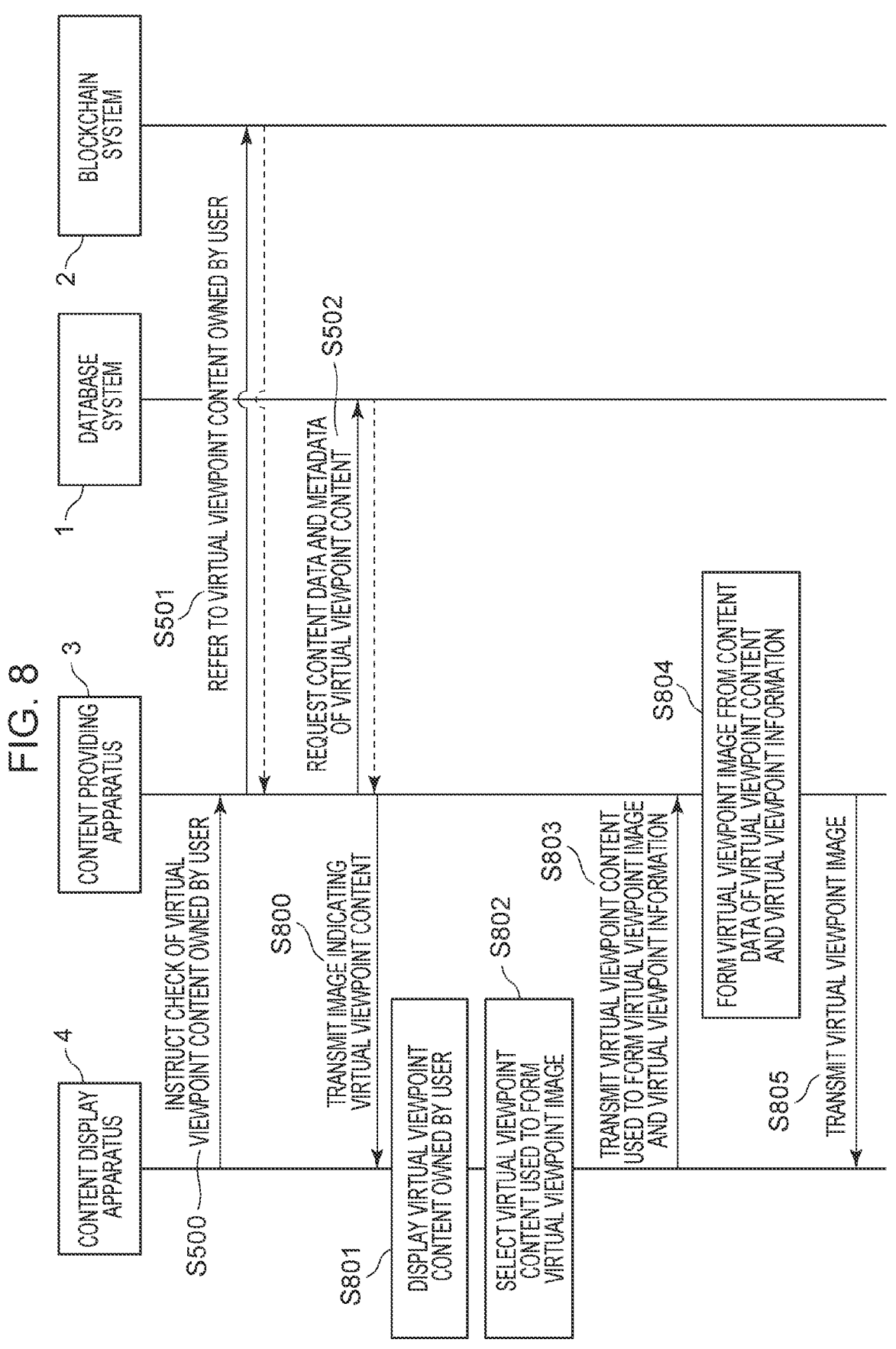
FIG. 8 is a chart representing a flow of a process of forming a virtual viewpoint image based on the virtual viewpoint content owned by a user in the first embodiment.

FIG. 8 is a chart representing a flow of a process of forming the virtual viewpoint image based on the virtual viewpoint content owned by a user. Processing executed in S500 to S502 is the same as that in FIG. 5, and hence description of the processing is omitted.

Step S800

In S800, the content providing apparatus 3 forms the image indicating the virtual viewpoint content owned by the user from the content data and the metadata of the virtual viewpoint content received from the database system 1 and transmits the formed image to the content display apparatus 4. In more detail, the content providing apparatus 3 forms an image including both the icon denoting the data type of the virtual viewpoint content and the name of the virtual viewpoint content and transmits the formed image.

Step S801

In S801, the content display apparatus 4 displays a list of items of the virtual viewpoint content owned by the user by displaying the images of the items of the received virtual viewpoint content. Details will be described with reference to FIG. 9.

Step S802

In S802, the content display apparatus 4 selects, in accordance with a user operation, one or more items of virtual viewpoint content used to form the virtual viewpoint image. The user can select the one or more items of the virtual viewpoint content used to form the virtual viewpoint image by selecting one or more among the items of the virtual viewpoint content owned by the user. On that occasion, restrictions are set on the selection of the virtual viewpoint content depending on the data type of each virtual viewpoint content. An example of the restrictions is the number of selectable items of the virtual viewpoint content or the data type. In more detail, the foreground shape model and the foreground skeleton model can be selected such that one character is displayed on the virtual viewpoint image. Furthermore, the background shape model and the background texture image can be selected such that one background model is displayed on the virtual viewpoint image. Moreover, the content display apparatus 4 sets, in accordance with a user operation, the virtual viewpoint information used to form the virtual viewpoint image. The virtual viewpoint information is information indicating the position and the orientation of the virtual camera. In this embodiment, the virtual viewpoint information is set corresponding to the selected virtual viewpoint content for making the user operation easier.

Details of setting of the virtual viewpoint information will be described with reference to FIG. 9.

Step S803

In S803, the content display apparatus 4 transmits the information indicating the virtual viewpoint content selected in S802 and the virtual viewpoint information to the content providing apparatus 3.

Step S804

In S804, the content providing apparatus 3 forms the virtual viewpoint image based on the selected virtual viewpoint content and the set virtual viewpoint information. In more detail, the content providing apparatus 3 arranges the content data of the virtual viewpoint content selected from respective content data of the virtual viewpoint content items acquired in S502 in the virtual space and forms the virtual viewpoint image based on the set virtual viewpoint information.

Step S805

In S805, the content providing apparatus 3 transmits the virtual viewpoint image formed in S804 to the content display apparatus 4. The content display apparatus 4 displays the received virtual viewpoint image. Details will be described with reference to FIG. 9.

With the above-described process, the user can select the virtual viewpoint content owned by the user and can view the virtual viewpoint image formed based on the selected virtual viewpoint content.

Figure 9:
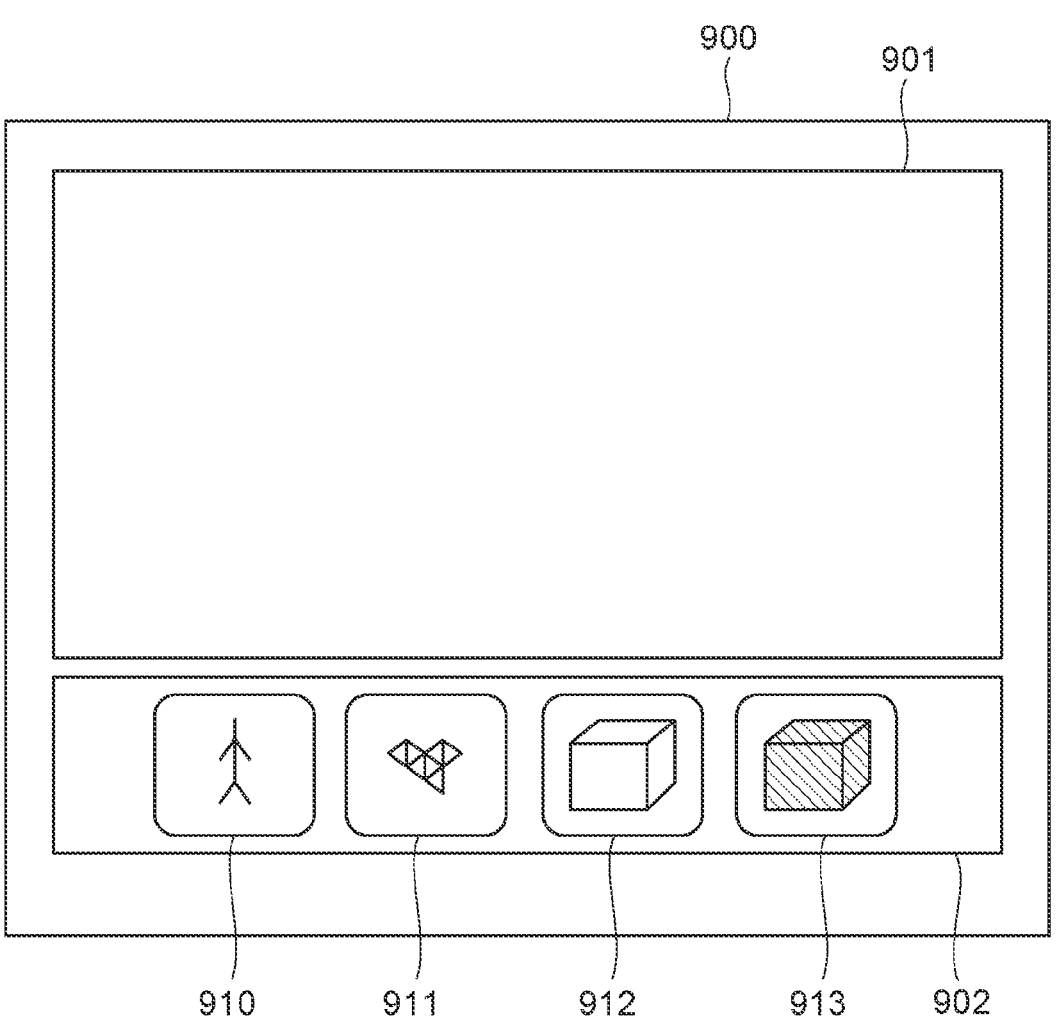
FIG. 9 illustrates an operation screen for use in forming the virtual viewpoint image in the first embodiment.

FIG. 9 illustrates an operation screen used by the user to form the virtual viewpoint image. A virtual viewpoint image forming screen 900 is constituted by a rendering image display region 901 and a virtual viewpoint content selection GUI 902. The rendering image display region 901 displays the virtual viewpoint image formed based on the virtual viewpoint content selected by the user. The virtual viewpoint content selection GUI 902 displays a button corresponding to the virtual viewpoint content owned by the user. In this embodiment, the virtual viewpoint content selection GUI 902 is made up of a button 910 for controlling display of the foreground skeleton model, a button 911 for controlling display of the foreground shape model, a button 912 for controlling display of the background shape model, and a button 913 for controlling display of the background texture image. By pressing any of those buttons, the user can select the virtual viewpoint content used to form the virtual viewpoint image. In this embodiment, an icon corresponding to one virtual viewpoint content is displayed as one button. Furthermore, the selected button and the unselected button are displayed to be distinguishable from each other. For example, brightness or hue of the selected button may be set to be different from that of the unselected button, or an icon denoting the button being selected may be displayed in a superimposed relation.

Furthermore, the surrounding of the selected button may be displayed in a highlighted state. The virtual viewpoint image formed based on the selected virtual viewpoint content is displayed in the rendering image display region 901. The virtual viewpoint information (the position and the orientation of the virtual camera) used to form the virtual viewpoint image is assumed to be manipulatable depending on the selected virtual viewpoint content. More specifically, when one of the foreground skeleton model and the foreground shape model is selected, the virtual camera can be manipulated such that an object of a three-dimensional shape corresponding to the selected model is captured at the center of the virtual viewpoint image. The position and the orientation of the virtual camera is controlled such that the centroid position of the object of the three-dimensional shape in the virtual space is located at a viewing point position of the virtual camera. In an example, the user can manipulate the virtual camera on a spherical orbit or a circumferential orbit around the object of the three-dimensional shape by performing a touch operation, such as a slide operation or a pinch-in and pinch-out operation, on the rendering image display region 901. If the object of the three-dimensional shape is maintained at the center of the virtual viewpoint image, the manipulation of the virtual camera is not limited to the spherical orbit or the circumferential orbit. When one of the foreground skeleton model and the foreground shape model is not selected and the background shape model is selected, the position and the orientation of the virtual camera can be changed such that the centroid position of the background shape model is maintained at the center of the virtual viewpoint image. A manipulation method is similar to that when one of the foreground skeleton model and the foreground shape model is selected. When only the background texture image is selected, the background texture image is displayed in the rendering image display region 901. Because the background texture image is a two-dimensional image, the manipulation of the virtual viewpoint cannot be made on the background texture image. Thus, the user can form the desired virtual viewpoint image by selecting the virtual viewpoint content owned by the user with the virtual viewpoint content selection GUI 902 and performing the touch operation on the rendering image display region 901. A condition may be set on the virtual viewpoint content used to form the virtual viewpoint image. In this embodiment, for each of the background shape model and the background texture image, only one model or image is selectable.

Figure 10:
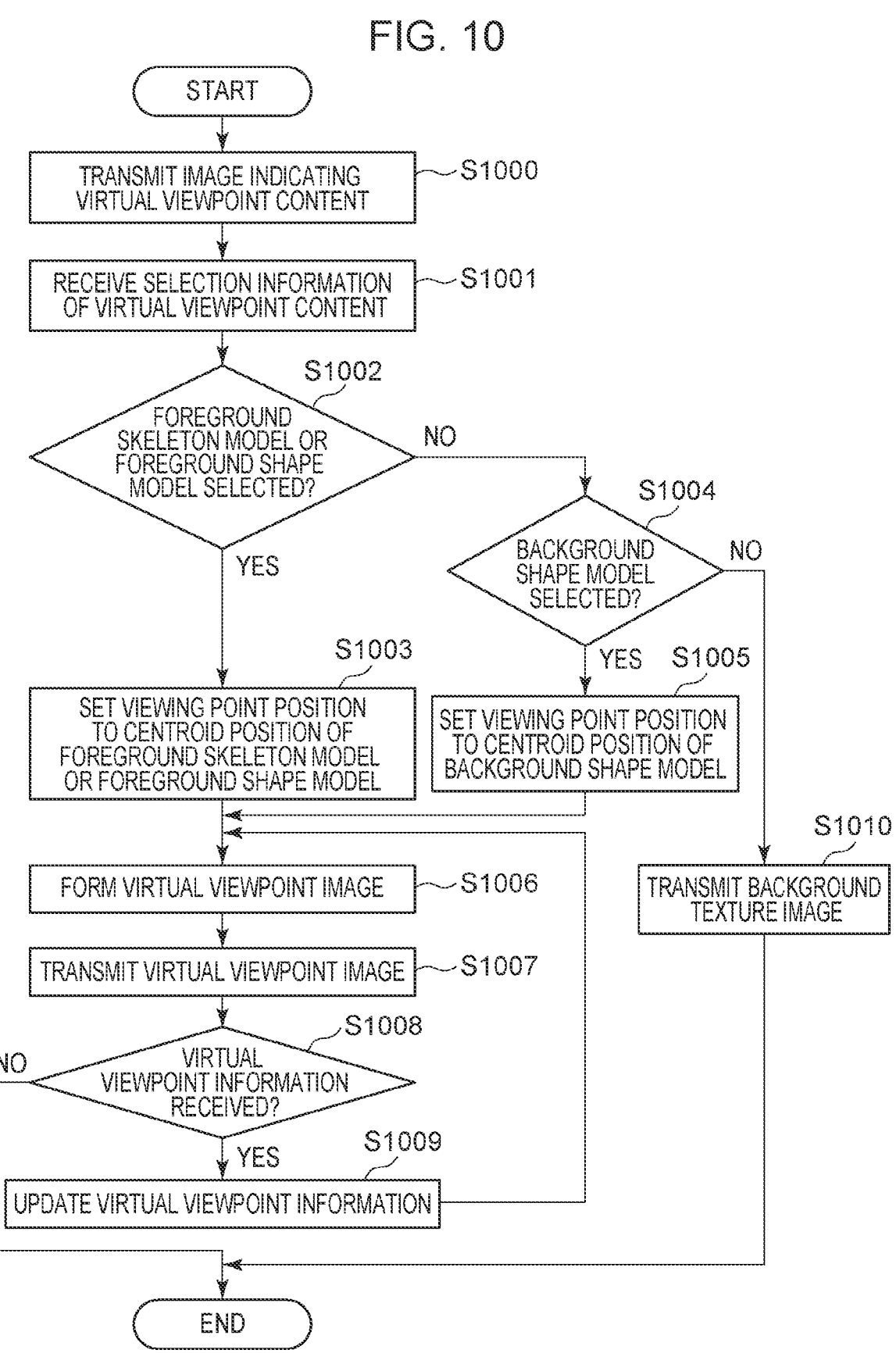
FIG. 10 is a flowchart representing a process of forming a virtual viewpoint image based on both selected virtual viewpoint content and virtual viewpoint information in the first embodiment.

FIG. 10 is a flowchart representing a process of forming the virtual viewpoint image based on both the selected virtual viewpoint content and the virtual viewpoint information by the content providing apparatus 3.

Step S1000

In S1000, the content providing apparatus 3 transmits, to the content display apparatus 4, the images indicating items of the virtual viewpoint content owned by the user. The content display apparatus 4 displays a list of the images indicating the items of the received virtual viewpoint content.

Step S1001

In S1001, the content providing apparatus 3 receives the selection information of the virtual viewpoint content from the content display apparatus 4. The selection information of the virtual viewpoint content is information indicating which virtual viewpoint content has been selected by the user. If the selection information is not received, the content providing apparatus 3 waits until the selection information is received.

Step S1002

In S1002, the content providing apparatus 3 determines from the selection information of the virtual viewpoint content, received in S1001, whether the foreground skeleton model or the foreground shape model is selected. If the foreground skeleton model or the foreground shape model is selected, the process advances to S1003. If the foreground skeleton model or the foreground shape model is not selected, the process advances to S1004.

Step S1003

In S1003, the content providing apparatus 3 arranges the selected foreground skeleton model or the foreground shape model in the virtual space and sets the virtual viewpoint information such that the viewing point position of the virtual camera is aligned with the centroid position of the foreground skeleton model or the foreground shape model. When the foreground skeleton model or the foreground shape model has an orientation, the virtual camera is set to a position at the front of the foreground skeleton model or the foreground shape model.

Step S1004

In S1004, the content providing apparatus 3 determines from the selection information of the virtual viewpoint content, received in S1001, whether the background shape model is selected. If the background shape model is selected, the process advances to S1005. If the background shape model is not selected, the process advances to S1010.

Step S1005

In S1005, the content providing apparatus 3 arranges the selected background shape model in the virtual space and sets the virtual viewpoint information such that the viewing point position of the virtual camera is aligned with the centroid position of the background shape model. When the background shape model has an orientation, the virtual camera is set to a position at the front of the background shape model.

Step S1006

In S1006, the content providing apparatus 3 forms the virtual viewpoint image based on both the selected virtual viewpoint content and the virtual viewpoint information. The virtual viewpoint image formed based on the selected virtual viewpoint content is described below.

When only the foreground skeleton model is selected by the user, the virtual viewpoint image is formed by applying an existing CG rendering method to the foreground skeleton model. The foreground skeleton model is information representing a motion of the character. Accordingly, several bone models of different sizes are prepared in advance, and the motion information is applied to the bone model that is close to a body shape of the character of the foreground skeleton model. Thus, the virtual viewpoint image formed when the user selects the foreground skeleton model is an image obtained by applying the motion information of the foreground skeleton model to the bone model. Hence the user can view a result of displaying a joint position and a connection relationship between joints with the CG technique based on the foreground skeleton model.

When only the foreground shape model is selected by the user, the virtual viewpoint image is formed by applying the existing CG rendering method to the foreground shape model. This enables the user to view a result of displaying the foreground shape model with the CG technique such as a polygon or wire-frame method.

When the foreground skeleton model and the foreground shape model corresponding to the same character are selected by the user, the foreground shape model is deformed based on the joint position and angle information of the foreground skeleton model, and the virtual viewpoint image is formed by the existing CG rendering method. This enables the user to view an animation expressed using the foreground shape model with a motion.

When only the background shape model is selected by the user, the virtual viewpoint image is formed by rendering the background shape model with the polygon or wire-frame method. This enables the user to view a result of displaying the background shape model with the CG technique.

When the background shape model and the background texture image corresponding to the same background model are selected by the user, the virtual viewpoint image is formed by rendering the background texture image on the background shape model with a texture mapping method. This enables the user to view a result of displaying the background shape model to which the background texture image is pasted.

When the foreground skeleton model and the foreground shape model of the same character and the background shape model and the background texture image corresponding to the same background model are selected by the user, the virtual viewpoint image is formed by combining them. In more detail, the virtual viewpoint image is formed by arranging, in the virtual space, the background model that is obtained by mapping the background texture image onto the background shape model, and combining, with the background model, the character that is obtained by giving an animation based on the foreground skeleton model to the foreground shape model. A position where the character is to be arranged in the virtual space is different per background model, and that position is supposed to be previously specified in the background shape model. As a result, the user can view an image displaying, by the CG technique, the character moving in the virtual space in which the background model is arranged. While, in this embodiment, the arrangement position of the character is supposed to be set in the background shape model, the present disclosure is not limited to that case. A modification may be made such that the arrangement position of the character can be set by a user operation.

In the above case, arrangement information indicating the position in the virtual space where the character is to be arranged and the orientation of the character is transmitted to the content providing apparatus 3.

Step S1007

In S1007, the content providing apparatus 3 transmits the virtual viewpoint image formed in S1006 to the content display apparatus 4.

Step S1008

In S1008, the content providing apparatus 3 determines whether the virtual viewpoint information designating the virtual camera is received from the content display apparatus 4. In other words, if any of the foreground skeleton model, the foreground shape model, and the background skeleton model is included in the selection information received in S1001, the content providing apparatus 3 receives information regarding user manipulation for the virtual camera from the content display apparatus 4.

Stated another way, when the virtual viewpoint content including the object of the three-dimensional shape to be arranged in the virtual space is selected, the content providing apparatus 3 accepts the user manipulation for the virtual camera. If the manipulation information for the virtual camera is received, the process advances to S1009, and if it is not received, the process is ended. Without being limited to the above case, the process may advance to S1001 for looping of this process if the manipulation information is not received.

Step S1009

In S1009, the content providing apparatus 3 updates the virtual viewpoint information based on the received manipulation information. Restrictions are set on the update of manipulation for the virtual viewpoint. More specifically, the received manipulation information is not reflected as it is on the virtual viewpoint information, and the virtual viewpoint information is updated while the manipulation information is corrected such that the selected virtual viewpoint content is positioned at the center of the virtual viewpoint image. In an example, the virtual viewpoint information is updated while the manipulation information is corrected such that the virtual camera is positioned on the spherical orbit or the circumferential orbit around the object of the three-dimensional shape. After that, the process advances to S1006.

Step S1010

In S1010, the content providing apparatus 3 transmits the selected background texture image to the content display apparatus 4. In this embodiment, since the data types of the virtual viewpoint content are set to the foreground skeleton model, the foreground shape model, the background shape model, and the background texture image, it can be determined from the processing of S1002 and S1004 that only the background texture image is included in the selection information. Because of the background texture image being a two-dimensional image, there is no need of setting the virtual viewpoint, and the background texture image is transmitted as it is to the content display apparatus 4.

With the above-described process, the user selects particular one or more from among the items of the virtual viewpoint content owned by the user and forms the virtual viewpoint image based on the selected virtual viewpoint content. Thus, the user can not only own the items of the virtual viewpoint content, but also can form the desired virtual viewpoint image by combining the items of the owned virtual viewpoint content.

While the character used to form the virtual viewpoint image is described above as being one, the present disclosure is not limited to that case. A virtual viewpoint image displaying multiple characters may also be formed. In such a case, the user can set a layout position and an orientation for each of the characters. Moreover, the position and the visual line direction of the virtual viewpoint are determined by selecting the character that is to be positioned at the center of the virtual viewpoint image.

More specifically, the position and the visual line direction of the virtual viewpoint can be set with the selected character being positioned at the center.

According to this embodiment, the foreground skeleton model, the foreground shape model, the background shape model, and the background texture image each created in advance can be stored in the database system and can be recorded on the blockchain. Furthermore, by checking a state of possession of the virtual viewpoint content by the user from the record on the blockchain and controlling a display method in accordance with the possession state, the content providing apparatus 3 can display the content to the content owner while protecting the right of the content creator. Moreover, the content owner can form the desired virtual viewpoint image by combining items of the virtual viewpoint content owned by the owner.

While the embodiment has been described in connection with the case in which the mesh of the foreground shape model does not include the color information, the present disclosure is not limited to that case, and the content creator may set the color information in advance. As an alternative, the content owner may set the color information.

While, in this embodiment, the content ID linked with the content data of the virtual viewpoint content in the database is recorded on the blockchain, the present disclosure is not limited to that case. Information (URI) indicating a place of the metadata of the virtual viewpoint content may be recorded. In such a case, the content ID is stored in the metadata.

Second Embodiment

The first embodiment has been described in connection with the case in which the virtual viewpoint content is created by using the existing CG tool. In this second embodiment, the virtual viewpoint content is created by using both a multi-viewpoint camera imaging system configured to capture images of a subject by multiple cameras and a virtual viewpoint content creation system. In the virtual viewpoint content used to generate the virtual viewpoint image in this embodiment, the foreground shape model and the foreground skeleton model are supposed to be formed from images of the subject captured by a multi-viewpoint camera. A foreground texture image to be pasted to the foreground shape model is also included in the virtual viewpoint content. While the background shape model and the background texture image are further supposed to be formed based on real images, the present disclosure is not limited to that case, and they may be formed by using the CG tool as in the first embodiment.

System Configuration

An image processing system according to the second embodiment will be described below with reference to the drawings.

Figure 11:
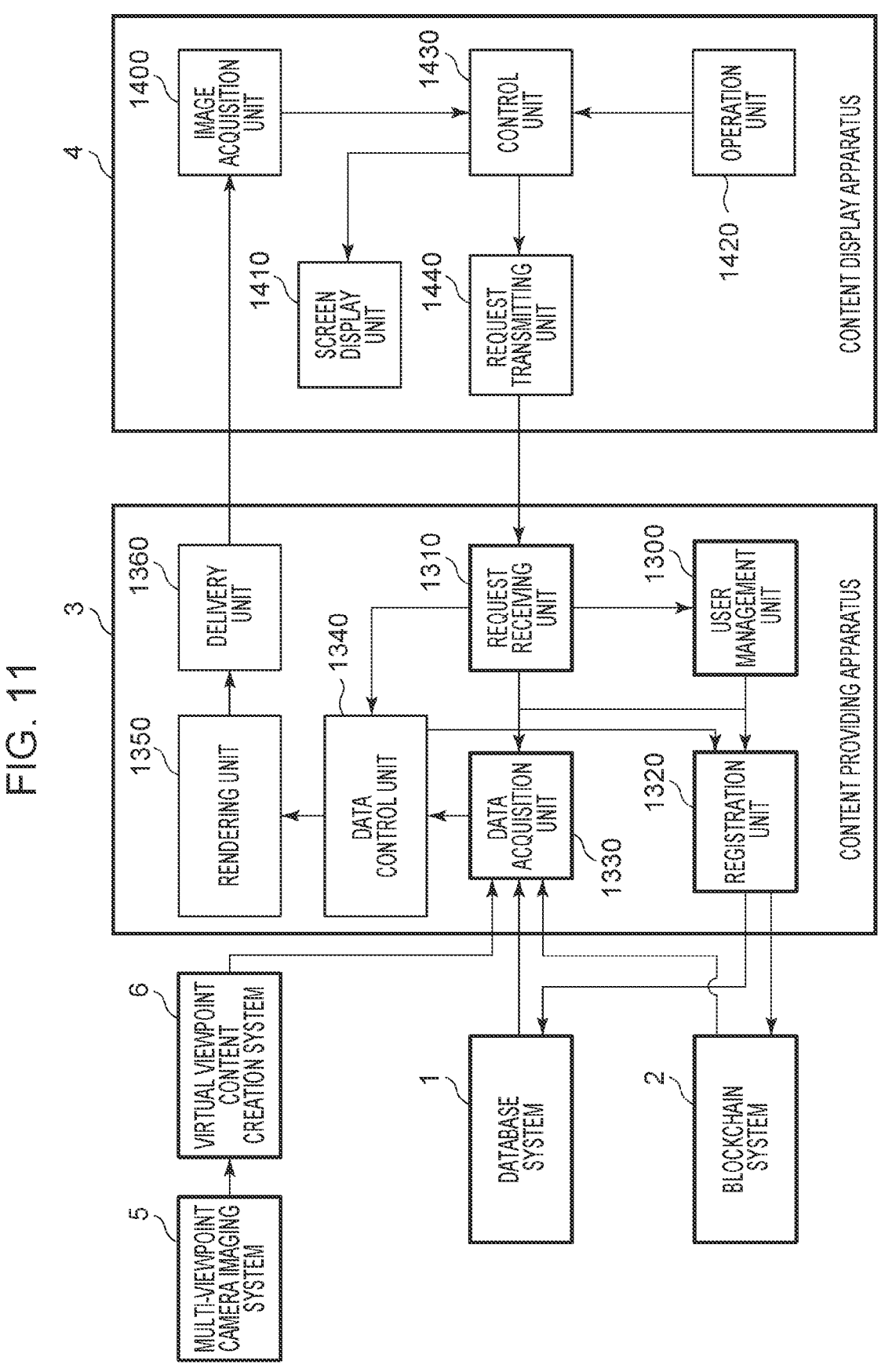
FIG. 11 is a block diagram of an image processing system according to a second embodiment.

FIG. 11 is a block diagram of the image processing system according to the second embodiment. The image processing system according to the second embodiment is constituted by the multi-viewpoint camera imaging system 5 and the virtual viewpoint content creation system 6 in addition to the configuration of the image processing system illustrated in FIG. 1.

The multi-viewpoint camera imaging system 5 is constituted by an image capturing apparatus and an image processing apparatus. The image capturing apparatus is constituted by multiple cameras arranged to capture images of the subject from different directions. Each of the cameras has an identification number for identifying the camera. The cameras are installed at different positions and in different directions so as to surround the subject. The cameras may not need to be installed over the entire surrounding of the subject and may be installed in part of directions due to, for example, restrictions on the installation place. The number of cameras is not limited. In an example, when an imaging target is a soccer or rugby game, several ten to several hundred cameras may be installed around a stadium. Cameras with different angles of view, such as a telephoto camera and a wide-angle camera, may be installed. The cameras are synchronized in accordance with one piece of time information in the real world, and information of time of image-capturing is given to an image of a captured video per frame. The image processing apparatus forms a foreground image from the image captured by the camera. The foreground image is an image formed by extracting a subject region (foreground region) from the captured image. Generally, the subject extracted as the foreground region indicates a dynamic subject (moving body) which accompanies a motion (namely, of which position and shape are changeable) when an image is captured in time series. Examples of the dynamic subject are a person, such as a player or a referee of a competition in a field where the competition is performed, and a ball in addition to the person when the competition is a ball game. Other examples of the subject in a concert and an entertainment are a singer, an instrumentalist, a performer, and a master of ceremony. This embodiment is described on an assumption that the image capturing apparatus includes one camera and one image processing apparatus, namely that one image processing apparatus is associated with one camera. Multiple cameras may be connected to one image processing apparatus. The image processing apparatus additionally includes a unit configured to detect an abnormality and sends, to a shape estimation apparatus, abnormality information notifying the presence of the abnormality. The abnormality of the camera can be detected, for example, by evaluating a general sensor value indicating heat, vibration, or another factor.

The image processing apparatus holds status information such as a position, a posture (orientation or image capturing direction), a focal length, an optical center, a distortion, and an F-value of the camera. The position and the posture (orientation or image capturing direction) of the camera are controlled by the image processing apparatus. While the word "camera parameters" is used in the following description as indicating a camera status, those parameters may include a parameter controlled by another apparatus such as a pan head. The camera parameters regarding the position and the posture (orientation or image capturing direction) of the camera are the so-called extrinsic parameters. The camera parameters regarding the focal length, the image center, and the distortion are the so-called intrinsic parameters. The position and the posture of the camera are indicated using one world coordinate system that is expressed by an origin, an Xw-axis, a Yw-axis, and Zw-axis of a three-dimensional coordinate space. A camera image coordinate system (hereinafter referred to as an "image coordinate system") in the image captured by the camera is expressed by an origin, an Xi-axis, and a Yi-axis of a two-dimensional coordinate system.

The virtual viewpoint content creation system 6 estimates a three-dimensional shape of the subject of which image is captured by each image capturing apparatus of the multi-viewpoint camera imaging system 5. To that end, the virtual viewpoint content creation system 6 acquires the foreground image and the camera parameters of each camera from an image processing apparatus of the multi-viewpoint camera imaging system 5. Alternatively, the camera parameters of each camera may be calculated. In such a case, for example, the virtual viewpoint content creation system 6 extracts feature points from a marker image (for example, a checkerboard) for calibration of the camera and holds the feature points in correspondence to each other, the marker image being captured by each camera in advance. Then, the camera parameters are calculated by performing calibration of each camera while the camera parameters are optimized such that errors when corresponding points are projected onto the individual cameras are minimized. A calibration method may be any suitable one of existing methods. The camera parameters may be acquired in synchronism with the image capturing, may be acquired in a stage of advance preparation, or may be acquired as required asynchronously with the image capturing. The virtual viewpoint content creation system 6 estimates the foreground shape model of the subject based on the foreground image and the camera parameters. The foreground shape model is estimated by, for example, a visual hull (shape from silhouette) method. Point cloud information expressing the foreground shape model of the subject is obtained as a result of processing by the above-mentioned method. The coordinates of each point are expressed using, for example, the same coordinate system (world coordinate system) as that for the extrinsic parameters of the camera. Furthermore, the obtained point cloud information is divided into pieces of point cloud information per subject by processing the obtained point cloud information with a general three-dimensional labeling method based on whether an adjacent point is present. A subject ID as a labeling result is as signed to each point, and the point cloud information per subject is obtained by designating the subject ID. Moreover, by applying a Marching Cubes method to the obtained point cloud information, the point cloud information can be expressed as a set of triangular patches. Texture information is then obtained by selecting, based on a normal of each triangular patch and a visual line vector of each camera, the camera that is most probably positioned at the front of the triangular patches, and by projecting the triangular patches. In such a manner, the foreground shape model and the foreground texture image expressed by the triangular patches per subject can be formed. A shape estimation method may be a general one other than the above-described method. In estimating the foreground skeleton model, a standard shape model corresponding to the skeleton model is deformed such that a region on an image obtained by projecting the standard shape model to each camera is aligned with the foreground region, and skeleton information with which the best match between both the regions is obtained is estimated as the foreground skeleton model. A method of estimating the foreground skeleton model is not limited to the above-described one, and various methods, such as a method of estimating two-dimensional skeleton information on a two-dimensional image and estimating a three-dimensional skeleton model based on correspondence between the two-dimensional skeleton information and the individual cameras, may also be used. Motion information includes information regarding a speed of an arm of a pitcher, a speed of a leg of a soccer player, a running distance of the player, and so on. The running distance of the subject can be calculated by determining the subject to be the same based on a three-dimensional position of a joint in the skeleton model per frame, and by continuously tracking the position of the subject. The virtual viewpoint content created by the virtual viewpoint content creation system 6 is transmitted to the data acquisition unit 1330 of the content providing apparatus 3. After that, the virtual viewpoint content is transmitted to the registration unit 1320 via the data control unit 1340 to be stored in the database system 1 and recorded on the blockchain system 2.

Operation Flow

Figure 12:
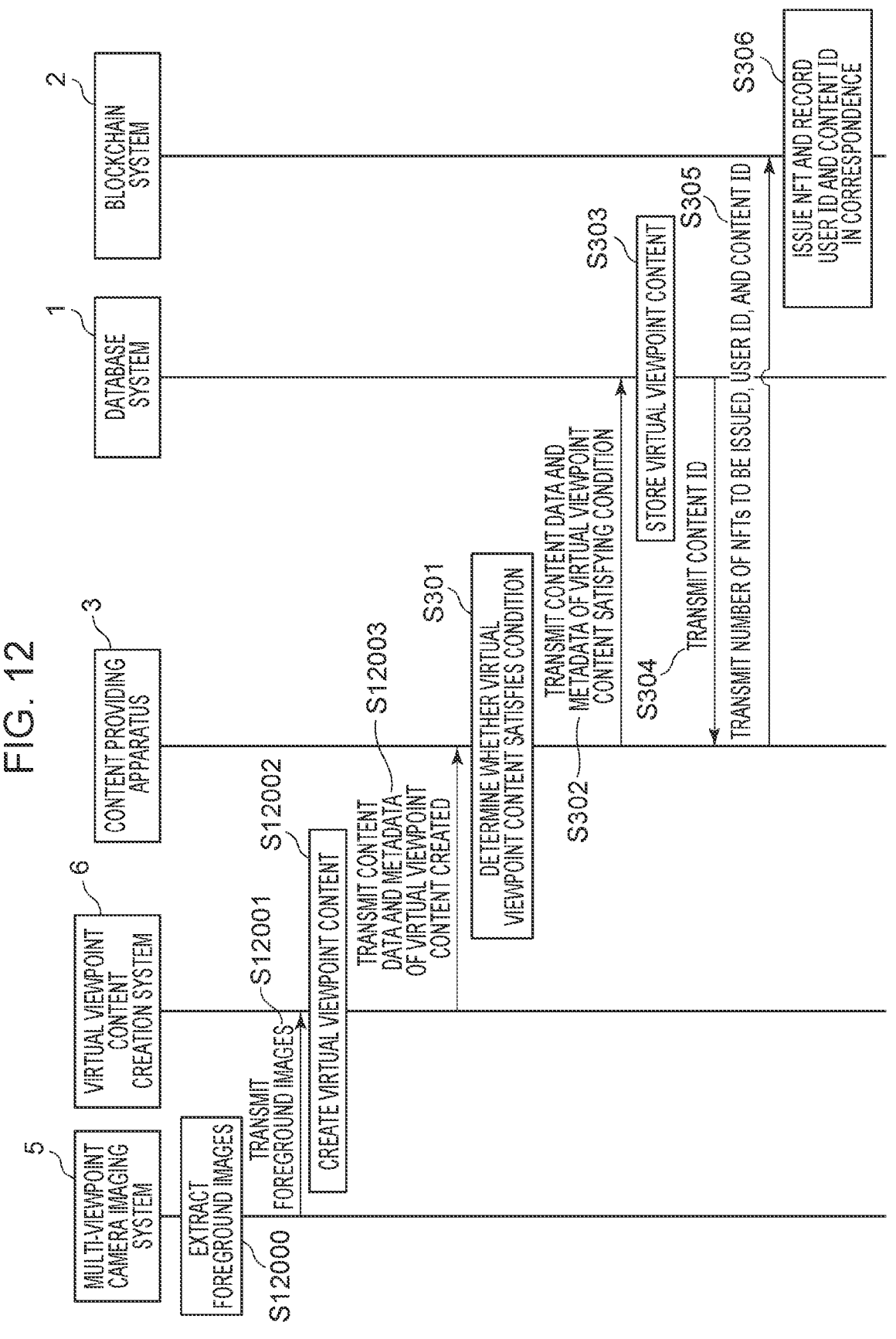
FIG. 12 is a chart representing a flow of a process of registering the virtual viewpoint content in the second embodiment.

FIG. 12 is a chart representing a flow of a process of registering the virtual viewpoint content that is created from the images captured by the multi-viewpoint camera imaging system 5. Processing executed in S301 to S306 is the same as that in FIG. 3, and hence description of the processing is omitted.

Step S12000

In S12000, the multi-viewpoint camera imaging system 5 extracts the foreground images from the images captured by all the cameras.

Step S12001

In S12001, the multi-viewpoint camera imaging system 5 transmits the foreground images captured by all the cameras, extracted in S12000, to the virtual viewpoint content creation system 6.

Step S12002

In S12002, the virtual viewpoint content creation system 6 creates the foreground shape model, the foreground skeleton model, and the foreground texture image of the subject based on the foreground images received in S12001.

Step S12003

In S12003, the virtual viewpoint content creation system 6 transmits the foreground shape model, the foreground skeleton model, and the foreground texture image, created as mentioned above, to the database system 1 via the content providing apparatus 3. The created data may be directly transmitted to the database system 1 while bypassing the content providing apparatus 3.

With the above-described process, the virtual viewpoint content created by the multi-viewpoint camera imaging system 5 and the virtual viewpoint content creation system 6 can be registered on the database system 1 and recorded on the blockchain system 2.

Figure 13:
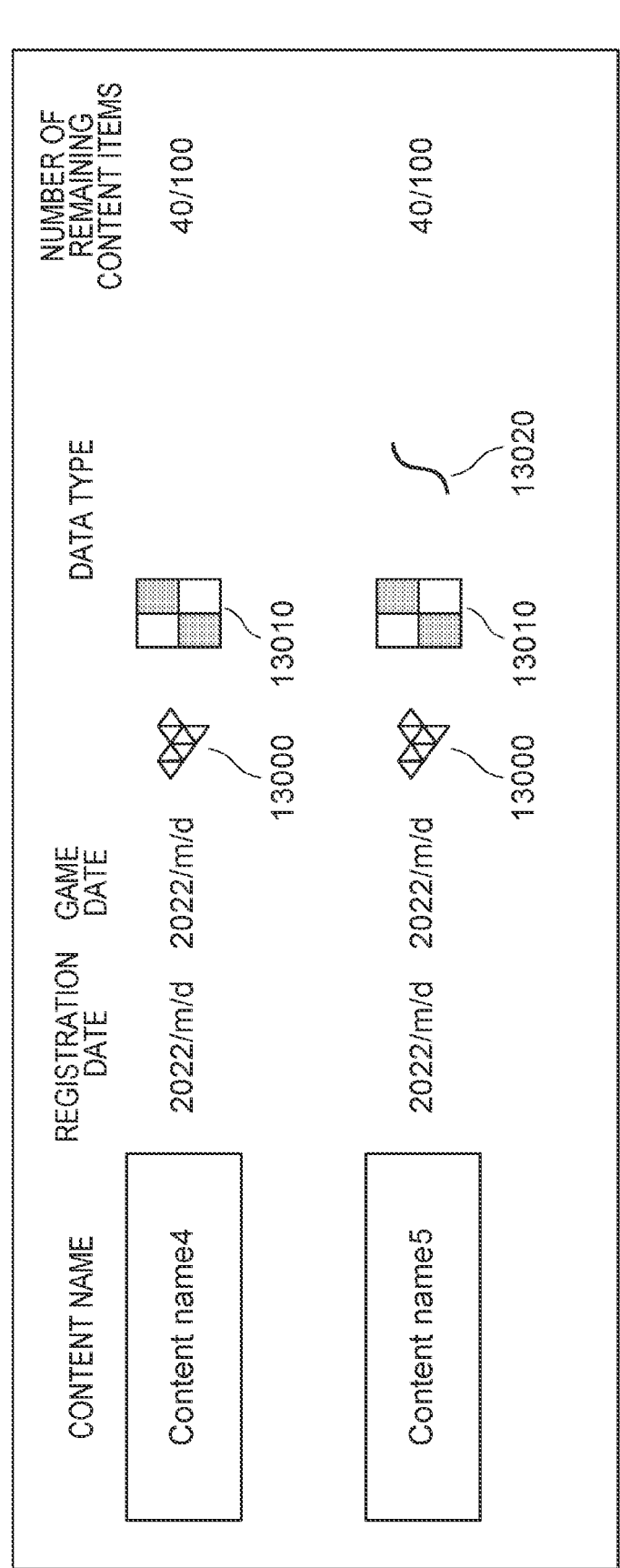
FIG. 13 illustrates a purchase screen for the virtual viewpoint content in the second embodiment.

FIG. 13 illustrates a purchase screen for the virtual viewpoint content, the purchase screen being displayed on the content display apparatus 4. Unlike the first embodiment, an icon denoting the data type of the virtual viewpoint content created by the multi-viewpoint camera imaging system 5 and the virtual viewpoint content creation system 6 is newly displayed. In other words, the virtual viewpoint content created from a real image and the virtual viewpoint content created by using the existing CG tool, for example, are displayed as different data types of virtual viewpoint content. An icon 13000 indicates that the foreground shape model created from the real image is included in the content. Similarly, an icon 13010 indicates that the foreground texture image to be pasted to the foreground shape model is included in the content. An icon 13020 indicates that the foreground skeleton model estimated from the subject image is included in the content denoted as "Content name5".

Figure 14:
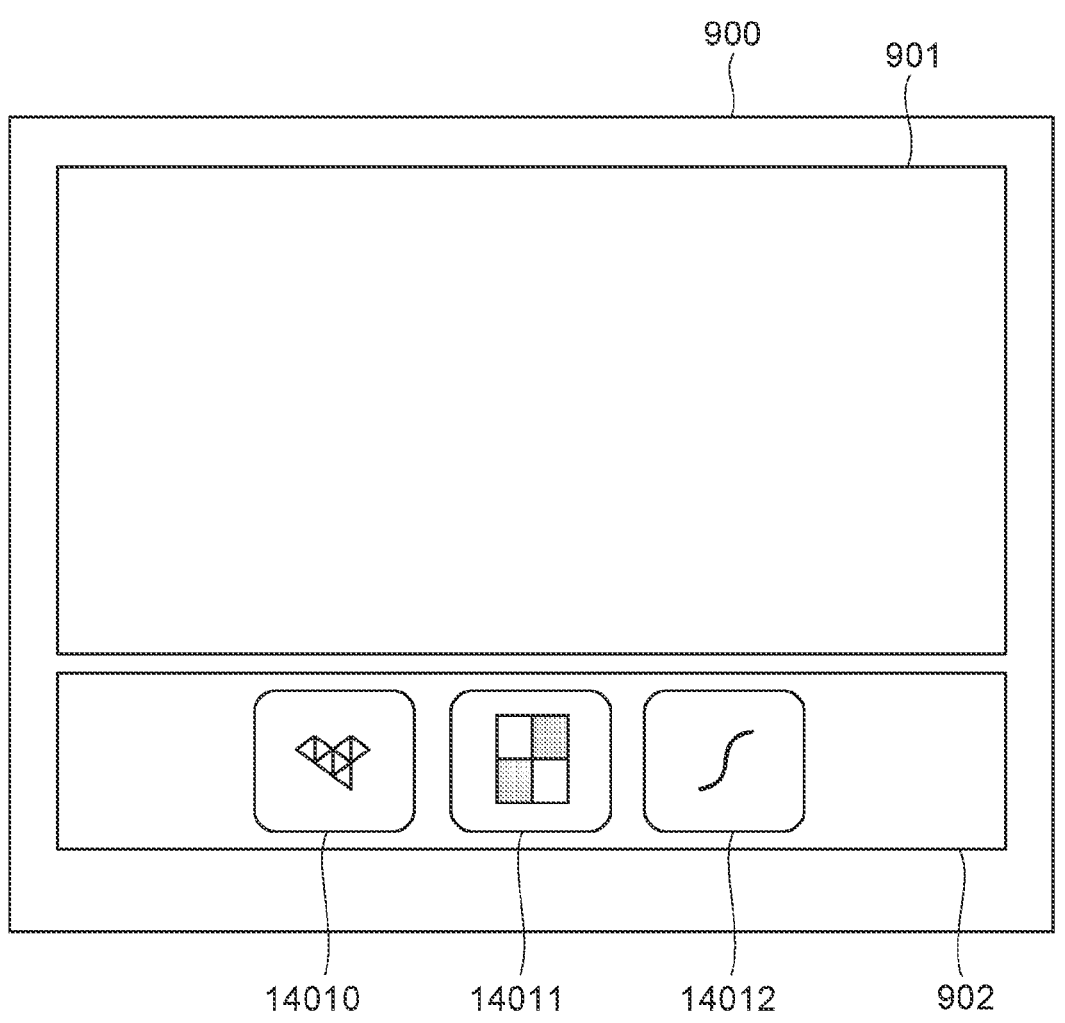
FIG. 14 illustrates an operation screen for use in forming the virtual viewpoint image in the second embodiment.

FIG. 14 illustrates an operation screen for use in forming the virtual viewpoint image. Unlike the operation screen illustrated in FIG. 9, a button 14010, a button 14011, and a button 14012 are added to a virtual viewpoint content selection GUI in FIG. 14. In more detail, the button 14010 indicates that display of the foreground shape model created from the real image is controlled, the button 14011 indicates that the foreground texture image created from the real image is controlled, and the button 14012 indicates that display of the foreground skeleton model created from the real image is controlled. When the foreground shape model created from the real image and the foreground skeleton model created from the real image are selected by pressing of the buttons, the virtual camera can be manipulated with a touch operation made on the rendering image display region 901. In this embodiment, the control is performed such that the foreground texture image cannot be selected unless the foreground shape model is selected.

FIG. 15 is a chart representing a process of forming the virtual viewpoint image based on the virtual viewpoint content owned by the user and created from the real image. S1000 to S1005 and S1007 to S1010 are the same as those in FIG. 10, and hence description of those steps is omitted.

Step S1500

In S1500, processing to be made when the user selects the foreground texture image is executed in addition to S1006 in FIG. 10. It is here supposed that the foreground texture image can be selected on condition of the foreground shape model being selected. When the foreground shape model and the foreground texture image are selected by the user, the virtual viewpoint image is formed by rendering the foreground texture image on the foreground shape model with the texture mapping method. As a result, the user can form the virtual viewpoint image of the subject, that image being created from the real image.

According to this embodiment, the virtual viewpoint image can be formed using the foreground shape model, the foreground skeleton model, and the foreground texture image of the subject, those models and image being created from the multi-viewpoint camera images captured by the multi-viewpoint camera. In other words, the virtual viewpoint image can be formed by combining items of the virtual viewpoint content created from the real images.

Third Embodiment

In the first embodiment and the second embodiment, the manipulation of the virtual camera is restricted such that the position of the virtual viewpoint content is located at the center of the virtual viewpoint image. However, when multiple characters are arranged in the virtual space, there is a possibility that all selected ones of the characters cannot be displayed within the virtual viewpoint image in some cases if the position and the orientation of the virtual camera are determined to locate at the center of a particular one of the characters.

There is also a possibility that the virtual viewpoint image reflecting the characters at angles of view desired by the user cannot be formed in some cases. This embodiment is described in connection with a method of assigning the NFT (Non-Fungible-Token) to virtual camera information used to form the virtual viewpoint image, and controlling a process of displaying the virtual viewpoint image based on both the owner information of the virtual viewpoint image and the user information. The virtual viewpoint content in this embodiment includes the virtual camera information in addition to the virtual viewpoint content in the first embodiment and the second embodiment. The virtual camera information includes the extrinsic parameters and the intrinsic parameters of the virtual camera and information specifying the content. Virtual camera path information may also be included in the virtual viewpoint content. The virtual camera path information is information obtained by adding the time information to the virtual camera information and can express camera work of the virtual camera. In other words, the virtual camera path information can express a locus of the virtual camera.

System Configuration

An image processing system according to a third embodiment has a similar configuration to that illustrated in FIG. 11, and hence description of the system configuration is omitted.

Operation Flow

Figure 16:
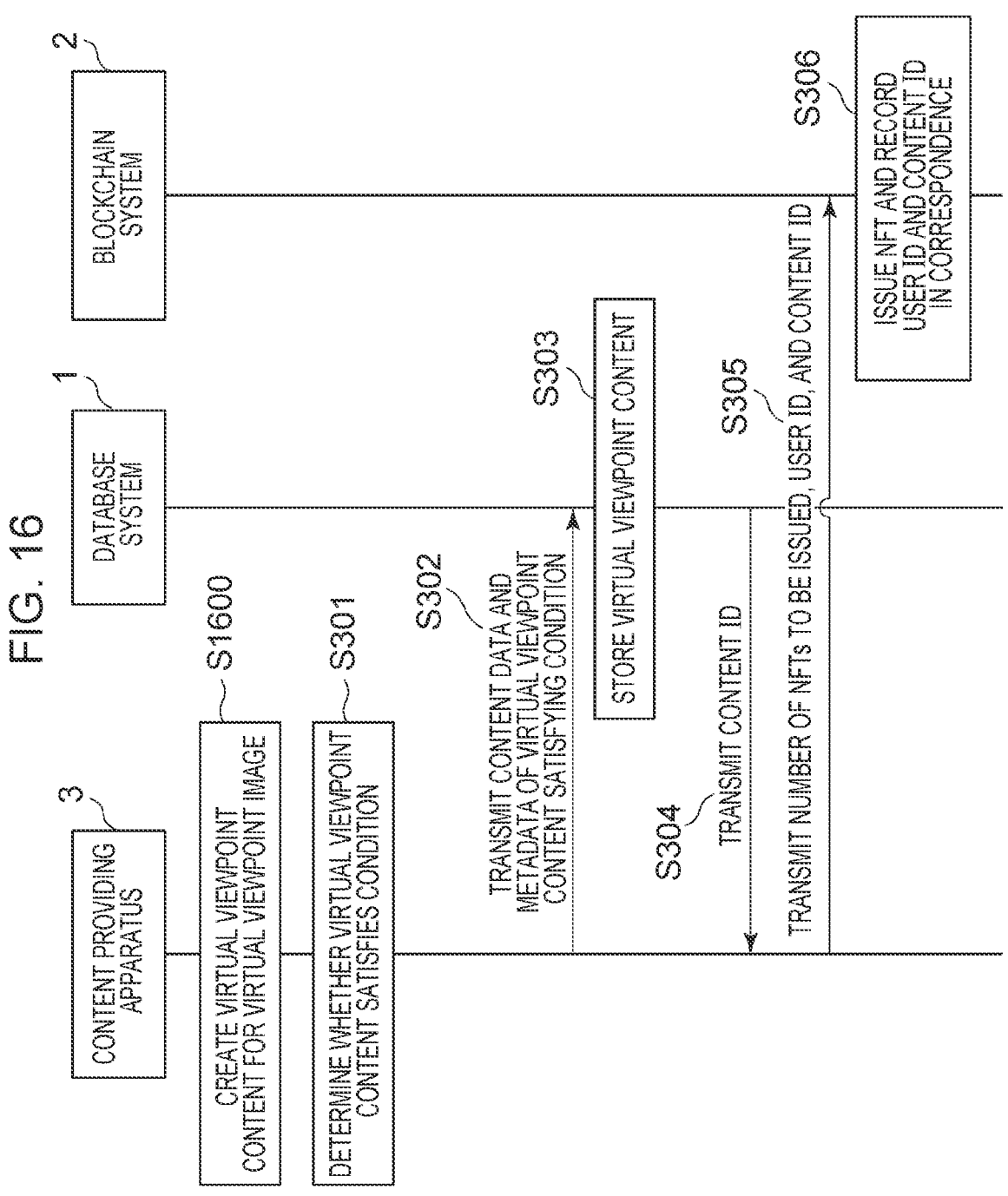
FIG. 16 is a chart representing a flow of a process of registering, as the virtual viewpoint content, virtual camera information and virtual camera path information in a third embodiment.

FIG. 16 is a chart representing a process of registering, as the virtual viewpoint content, the virtual camera information and the virtual camera path information. S301 to S306 are the same as those in FIG. 3, and hence description of those steps is omitted.

Step S1600

In S1600, the content providing apparatus 3 creates the virtual viewpoint content for the virtual camera information. In this embodiment, the virtual camera manipulation right and the virtual camera path are set as the virtual camera information. The virtual camera manipulation right is the right allowing the viewer to view the virtual viewpoint image with a free viewpoint while manipulating the virtual camera. When the user selects the owned virtual camera manipulation right, the user can manipulate the virtual camera without any restrictions unlike the first embodiment and the second embodiment. An image or an object of a three-dimensional shape, each indicating the virtual camera manipulation right, is formed as content data of the virtual camera manipulation right. A manipulation condition for allowing the virtual camera to be freely manipulated without any restrictions and the number of issued rights are generated as meta data of the virtual camera manipulation right. In an example, when the manipulation condition includes setting of restricting the virtual viewpoint content to basketball, there are no restrictions on the virtual camera only when the virtual viewpoint content regarding the basketball is selected. In another example, no restrictions may be set for the virtual viewpoint content regarding a particular character, or any manipulation restrictions may not need to be set. The virtual camera path indicates loci of the position and the orientation of the virtual camera. When the user selects the owned virtual camera path, the virtual camera is moved on the set virtual camera path. Alternatively, the user may be allowed to manipulate the virtual camera such that the virtual camera is moved on the virtual camera path.

Figure 17:
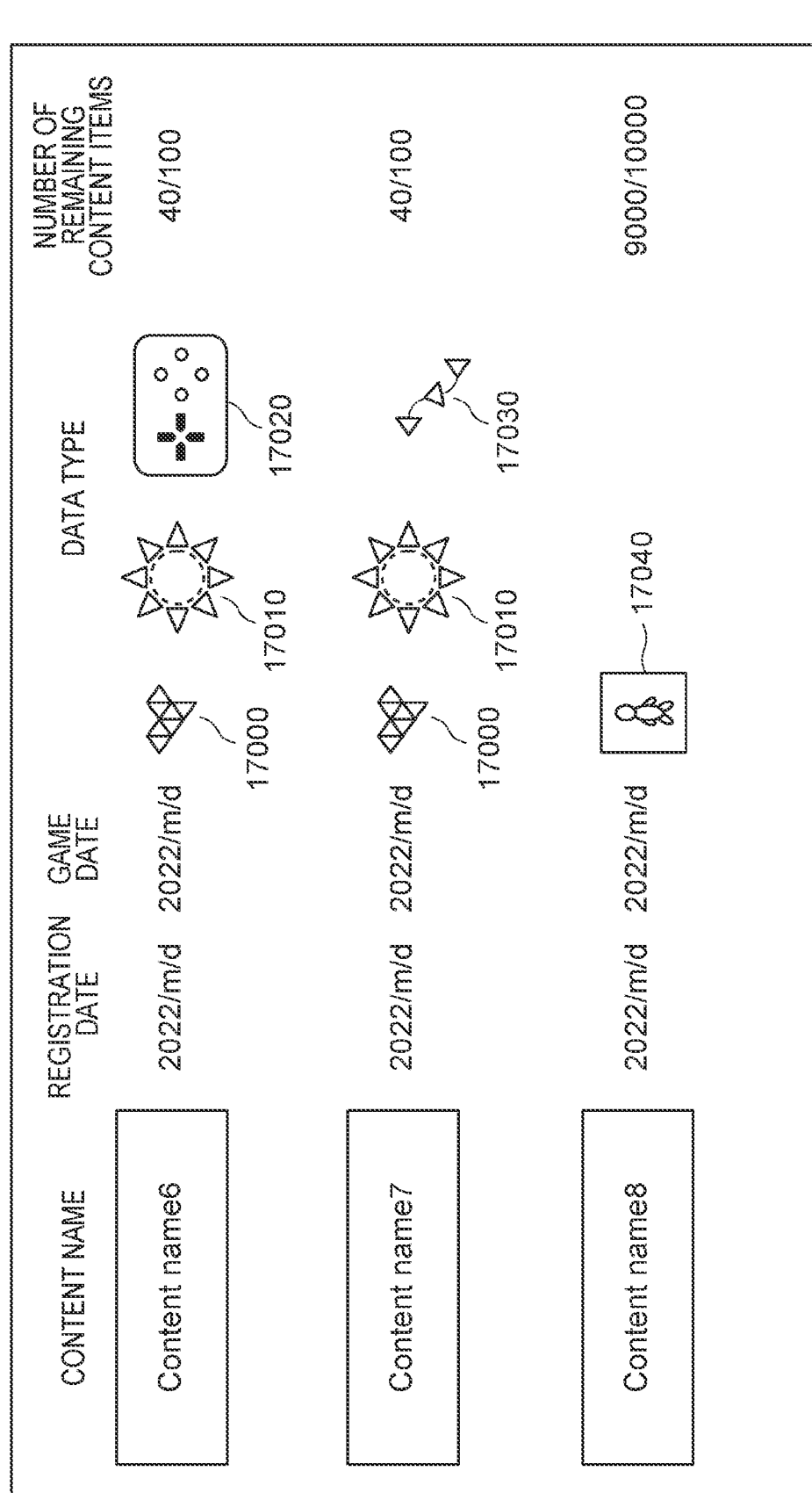
FIG. 17 illustrates a purchase screen for the virtual viewpoint content in the third embodiment.

FIG. 17 illustrates a purchase screen for the virtual viewpoint content displayed on the content display apparatus 4. Unlike the first embodiment and the second embodiment, an icon denoting the virtual camera information is newly displayed. An icon 17000 denoting the data type indicates that the foreground shape model of the subject is included in the content. Similarly, an icon 17010 indicates that an image of a real camera constituting the multi-viewpoint camera is included in the content. An icon 17020 indicates that the virtual camera manipulation right is included in the content. An icon 17030 indicates that the virtual camera path information is included in the content. An icon 17040 indicates that the viewing right for the virtual viewpoint image is included in the content. By purchasing the viewing right, the user can view the virtual viewpoint image that is formed in accordance with the virtual camera information determined by the system. In this case, however, the user cannot manipulate the virtual camera. Moreover, by purchasing a different virtual camera path, the user can view the virtual viewpoint image that is formed from the already purchased foreground shape model and foreground image in accordance with different virtual camera path information.

In the above case, the user selects the virtual camera path information from the content list display screen. At that time, the user selects the virtual camera path information by acquiring, from the content providing apparatus, a list of the virtual camera paths, the list including time code of the content of interest. The virtual viewpoint image is formed and displayed in accordance with the selected virtual camera path information, whereby the user can view the virtual viewpoint image using the different virtual camera path information. The virtual camera information used to form an image for the user with the viewing right is assumed to be, for example, information of the virtual camera that is manipulated by the user with the delivery right.

Figure 18:
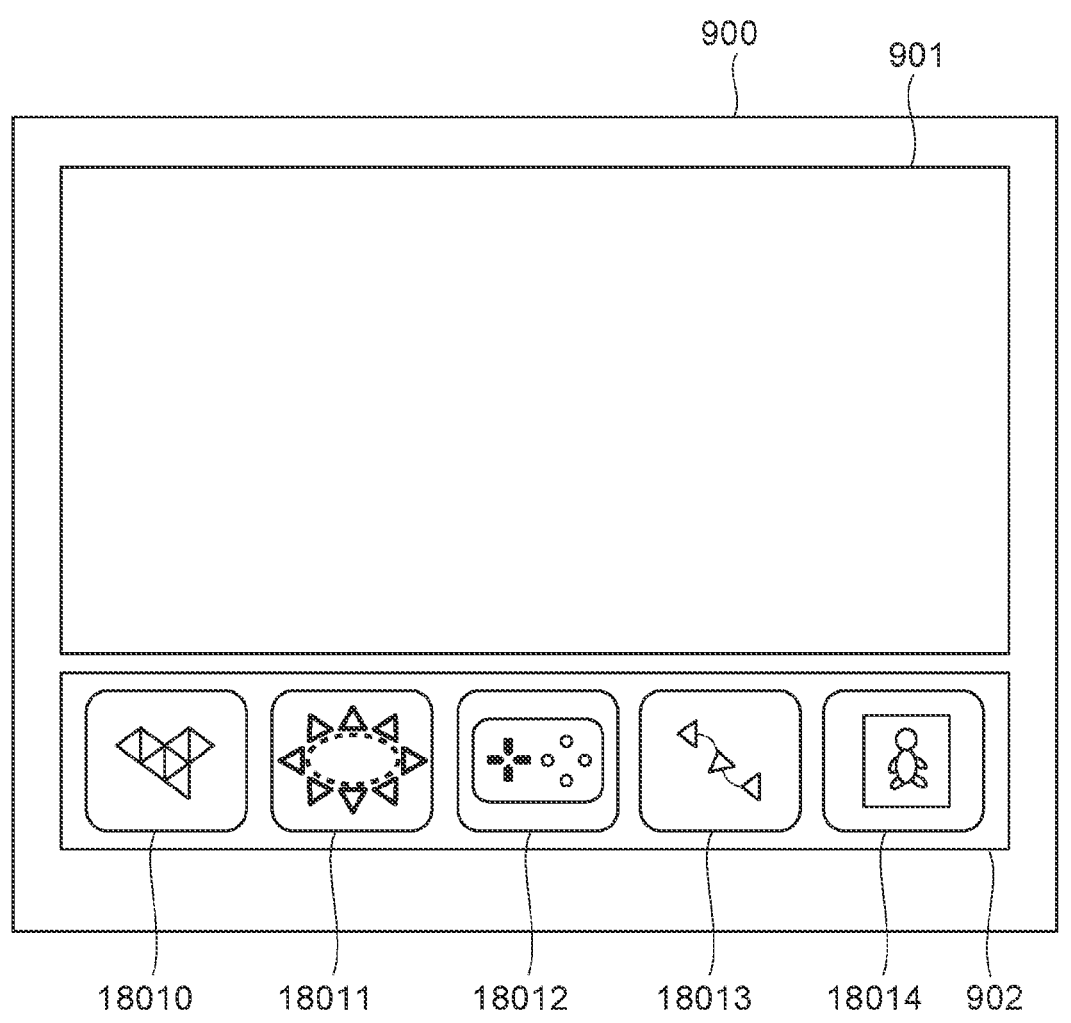
FIG. 18 illustrates an operation screen for use in forming the virtual viewpoint image in the third embodiment.

FIG. 18 illustrates an operation screen for use in forming the virtual viewpoint image. Unlike the operation screen illustrated in FIG. 9, a button 18010, a button 18011, a button 18012, a button 18013, and a button 18014 are added to a virtual viewpoint content selection GUI in FIG. 18. In more detail, the button 18010 indicates that display of the foreground shape model of the subject is controlled, and the button 18011 indicates that display of the image of the real camera is controlled. Moreover, the button 18012 indicates that the virtual viewpoint can be manipulated, the button 18013 indicates that display of the virtual viewpoint image using the virtual camera path information is controlled, and the button 18014 indicates that the viewing right of the virtual viewpoint image is given. When the manipulation condition is set on the virtual camera manipulation right, the button 18012 can be pressed for selection only when the manipulation condition is satisfied.

Figure 19:
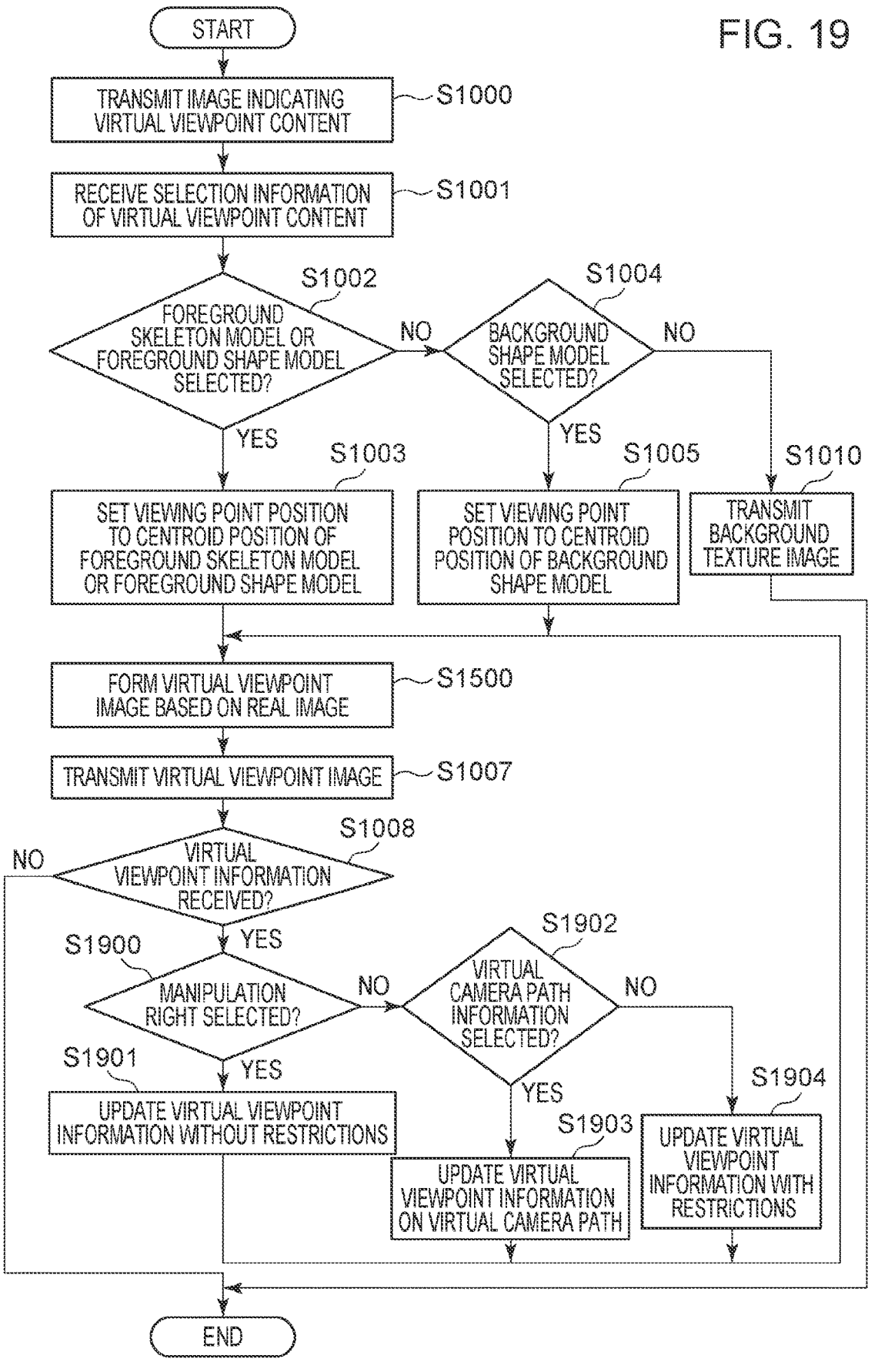
FIG. 19 is a chart representing a process of forming the virtual viewpoint image based on the virtual viewpoint content owned by the user in the third embodiment.

FIG. 19 is a chart representing a process of forming the virtual viewpoint image based on the virtual viewpoint content owned by the user and including the virtual camera information. S1000 to S1005 and S1007 to S1010 are the same as those in FIGS. 10, and S1500 is the same as that in FIG. 15. Hence description of those steps is omitted. It is further supposed that the manipulation condition for the virtual camera manipulation right is satisfied.

Step S1900

In S1900, the content providing apparatus 3 determines, from the selection information of the virtual viewpoint content received in S1001, whether the virtual camera manipulation right is selected. If the virtual camera manipulation right is selected, the process advances to S1901. If the virtual camera manipulation right is not selected, the process advances to S1902.

Step S1901

In S1901, the content providing apparatus 3 reflects the manipulation information for the virtual camera, received in S1008, as it is on the virtual viewpoint information. This enables the user to freely manipulate the virtual camera unlike the first embodiment and the second embodiment. After that, the process advances to S1500.

Step S1902

In S1902, the content providing apparatus 3 determines, from the selection information of the virtual viewpoint content received in S1001, whether the virtual camera path information is selected. If the virtual camera path information is selected, the process advances to S1903. If the virtual camera path information is not selected, the process advances to S1904.

Step S1903

In S1903, the content providing apparatus 3 updates the virtual camera information in accordance with the virtual camera path information. However, the present disclosure is not limited to that case, and the virtual camera may be controlled such that it can be manipulated to move along the virtual camera path. After that, the process advances to S1500.

Step S1904

In S1904, the content providing apparatus 3 updates the manipulation of the virtual camera such that the virtual viewpoint content is positioned at the center of the virtual viewpoint image. After that, the process advances to S1500.

With the above-described process, when the user has the virtual camera manipulation right, the user can freely manipulate the virtual camera and can form the virtual viewpoint image captured from the desired position and the direction. Furthermore, when the user owns the virtual camera path information, the virtual camera is set to the preset position and orientation, and the virtual viewpoint content can be arranged in the virtual space in response to the motion of the virtual camera.

According to this embodiment, the image processing system can provide the viewer with the viewing environment for the virtual viewpoint image at a free viewpoint in accordance with the manipulation right for the virtual camera information, the owner information of the virtual camera path information, and the information of the system user while protecting the right of the creator of the content that is used to form the virtual viewpoint image.

Furthermore, in accordance with the owner information of the viewing right of the virtual viewpoint image and the user information, the image processing system can provide the viewer with the viewing environment for virtual viewpoint image based on the virtual camera information that is set by a distributor.

While, in the above-described embodiment, the NFT is assigned to the virtual viewpoint content used to form the virtual viewpoint image, the present disclosure is not limited to that case. When the NFT is not assigned to the virtual viewpoint content, the virtual viewpoint content and the owner information of that virtual viewpoint content may be stored in the database system in correspondence.

The several embodiments of the present disclosure have been described in detail, but the present disclosure is not limited to those embodiments. The present disclosure can be variously modified in conformity with the gist of the present disclosure, and those modifications are not to be excluded from the scope of the present disclosure. For example, the above-described first to fourth embodiments may be combined with each other as appropriate.

According to the present disclosure, the content display process can be controlled in accordance with both the ownership assigned to the digital content used to form the virtual viewpoint image and the information of the system user.

Computer programs for implementing part or the whole of the control in the embodiments and the functions of the embodiments may be supplied to, for example, an image processing system via a network or any of various storage media. Furthermore, a computer (or a CPU, an MPU, or the like) in, for example, the image processing system may read and execute the programs. In such a case, the programs and the storage medium storing the programs also constitute the present disclosure.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-149598, filed Sep. 20, 2022, which is hereby incorporated by reference herein in its entirety.

What is claimed is:

1. An information processing apparatus comprising:
one or more memories storing instructions; and
one or more processors executing instructions to:
acquire user information of a first user;
acquire, based on the user information, one or more pieces of material data owned by the first user who is a current owner, and not acquire one or more pieces of material data owned by a second user who is a current owner, from among multiple pieces of material data recorded on a blockchain and generated based on multiple images captured by multiple image capturing apparatuses, the multiple material data including the one or more pieces of material data owned by the first user who is a current owner and the one or more pieces of material data owned by the second user who is a current owner;

output first information indicating the one or more pieces of material data owned by the first user who is the current owner;

second information indicating material data selected by the first user from among the one or more pieces of material data owned by the first user who is a current owner; and output a virtual viewpoint image generated based on the material data selected by the first user based on the second information.

2. The information processing apparatus according to claim 1, wherein:

the material data represent at least one of a shape model and a skeleton model of a subject of which image is captured by each of the image capturing apparatuses.

3. The information processing apparatus according to claim 2, wherein:

the shape model is a three-dimensional mesh model of the subject of which image is captured by each of the image capturing apparatuses.

4. The information processing apparatus according to claim 2, wherein:

the skeleton model is a bone model indicating a motion over time of the subject of which image is captured by each of the image capturing apparatuses.

5. The information processing apparatus according to claim 2, wherein:

when the material data selected by the first user represent the shape model and the skeleton model of the same subject, the virtual viewpoint image includes a mesh model indicating a motion over time of the same subject.

6. The information processing apparatus according to claim 1, wherein:

a non-fungible token is linked with the material data.

7. The information processing apparatus according to claim 1, wherein the one or more processors executing instructions to: :

acquires virtual viewpoint information indicating a position of a virtual viewpoint and a direction from the virtual viewpoint, wherein the virtual viewpoint image is formed based on the material data selected by the first user and on the virtual viewpoint information.

8. The information processing apparatus according to claim 1, wherein the one or more processors executing instructions to: :

acquires arrangement information indicating a position and an orientation in a virtual space at and in which the material data selected by the first user is to be arranged, and wherein the virtual viewpoint image is generated based on the material data selected by the first user and on the arrangement information.

9. An information processing method comprising:

acquiring user information of a first user;

acquiring, based on the user information, one or more pieces of material data owned by the first user who is a current owner, and not acquire one or more pieces of material data owned by a second user who is a current owner, from multiple pieces of material data recorded on a blockchain and generated based on multiple images captured by multiple image capturing apparatuses, the multiple material data including the one or more pieces of material data owned by the first user who is a current owner and the one or more pieces of material data owned by a second user who is a current owner;

outputting first information indicating the one or more pieces of material data owned by the first user who is the current owner;

second information indicating material data selected by the first user from among the one or more pieces of material data owned by the first user who is a current owner; and outputting a virtual viewpoint image generated based on the material data selected by the first user based on the second information.

10. A non-transitory storage medium storing a computer-readable program causing a computer to execute an information processing method comprising:

acquiring user information of a first user;

acquiring, based on the user information, one or more pieces of material data owned by the first user who is a current owner, and not acquire one or more pieces of material data owned by a second user who is a current owner, from multiple pieces of material data recorded on a blockchain and generated based on multiple images captured by multiple image capturing apparatuses, the multiple material data including the one or more pieces of material data owned by the first user who is a current owner and the one or more pieces of material data owned by a second user who is a current owner;

outputting first information indicating the one or more pieces of material data owned by the first user who is the current owner;

acquiring second information indicating material data selected by the first user from among the one or more pieces of material data owned by the first user who is a current owner; and outputting a virtual viewpoint image generated based on the material data selected by the first user based on the second information.

* * * * *